United States Patent [19]

Chao et al.

[11] Patent Number: 5,724,351
[45] Date of Patent: Mar. 3, 1998

[54] SCALEABLE MULTICAST ATM SWITCH

[76] Inventors: Hung-Hsiang Jonathan Chao, 13 Yellow Brook Rd., Holmdel, N.J. 07733; Byeong-Seog Choe, Hyundae Apt. 92-802, Apkoojung-Dong 482, Kangnam-Koo, Seoul, Rep. of Korea

[21] Appl. No.: 511,811

[22] Filed: Aug. 7, 1995

[30] Foreign Application Priority Data

Apr. 15, 1995 [KR] Rep. of Korea ................ 9161

[51] Int. Cl.⁶ ................ H04L 12/28; H04L 12/56
[52] U.S. Cl. ................ 370/395; 370/389; 370/397; 370/905
[58] Field of Search ................ 370/395, 414, 370/397, 355, 390, 396, 398, 416, 392, 391, 389, 905; 359/117

[56] References Cited

U.S. PATENT DOCUMENTS

| | | | |
|---|---|---|---|
| 5,157,654 | 10/1992 | Cisneros | 370/414 |
| 5,179,552 | 1/1993 | Chao | 370/427 |
| 5,255,265 | 10/1993 | Eng et al. | 370/416 |
| 5,436,893 | 7/1995 | Barnett | 370/392 |
| 5,483,521 | 1/1996 | Aramaki | 370/396 |
| 5,509,008 | 4/1996 | Genda et al. | 370/398 |

OTHER PUBLICATIONS

Chao, "A Recursive Modular Terabit/Second ATM Switch", IEEE Journal on Selected AReas in Communications, vol. 9, No. 8, Oct. 1991, pp. 1161–1172.

Chao et al., "Design and Analysis of a Large–Scale Multicast Output Buffered ATM Switch", IEEE/ACM Transactions on Networking, vol. 3, No. 2, Apr. 1, 1995, pp. 126–138.

Liew et al., "Comparison of Buffering Strategies for Asymmetric Packet Switch Modules", IEEE Journal on Selected Areas in Communications, vol. 9, No. 3, Apr. 1991, pp. 428–438.

*Primary Examiner*—Wellington Chin
*Assistant Examiner*—Melissa Kay Carman
*Attorney, Agent, or Firm*—Michaelson & Wallace; Peter L. Michaelson; John C. Pokotylo

[57] ABSTRACT

A multicast switch for routing incoming cells having a multicast bit pattern and a priority value, arriving at a plurality of input ports, to one of a plurality of output ports, which includes input port controllers and routing modules. Each of the routing modules routes received cells to an associated one of a plurality of groups of output ports and provides a feedback priority value based on a priority value associated with a lowest priority cell passed to the associated group of output ports. Each of the input port controllers receives the incoming cells, buffers a head-of-line cell, transmits the head-of-line cell to each of the routing modules, stores the multicast bit pattern, compares the priority value of the buffered head-of-line cell with the feedback priority values from each of the routing modules to form a set of comparison values, updates the multicast bit pattern based on the comparison values to form an updated multicast bit pattern, and either retransmits the buffered head-of-line cell, or buffers and transmits a next cell, based on the updated multicast bit pattern.

17 Claims, 10 Drawing Sheets

IPC : Input Port Controller
SWE : SWitch Element (a)

(b)

$A_W = A_N$ and $P_W > P_N$ (c)

$MP_j^m$: multicast pattern at the m-th time slot
$MP_j^{m+1}$: multicast pattern at the (m+1)-th time slot
LP : local priority level of the HOL cell
$FP_j$ : feedback priority level from j-th routing module (a)

(b)

SCALEABLE MULTICAST ATM SWITCH

BACKGROUND OF THE INVENTION a) Field of the Invention

The present invention concerns a novel architecture for a scaleable multicasting ATM switch with input and output buffers. The present invention also concerns a novel output port arbitration scheme.

b) Prior Art

Presently, a public integrated services digital network (ISDN) is being developed throughout the nationwide telephone system. This ISDN network will permit each ISDN subscriber to access a communication channel having a significantly wider bandwidth than that available with a conventional telephone connection (i.e., plain old telephone service or "POTS"). Although the bandwidth of basic ISDN will be sufficient to provide a wide variety of new communication services to each of its subscribers, emerging communications technologies, such as broadband video and very high speed data transmission will impose bandwidth requirements on subscriber ISDN channels that will far exceed the bandwidth of a basic rate ISDN interface. The basic rate ISDN interface consists of two 64 Kbit/second data channels and one 16 Kbit/second control signal channel.

For example, broadband video service offerings might include: desktop teleconferencing having voice/video/data communication for a single desktop terminal; distribution video; video-on-demand; video-telephony; still video picture services; and high definition television. Depending on the manner in which it is decoded, just one high definition television signal is expected to require a channel bandwidth of 45 Mbit/second. As this one example clearly illustrates, contemplated broadband video service offerings will require channel bandwidth far exceeding the bandwidth of the basic rate ISDN interface.

To provide sufficient channel bandwidth to meet expected subscriber demand in a public ISDN environment, the art has turned to implementing so called "broadband ISDN" (B-ISDN). In B-ISDN, each subscriber channel is envisioned as providing a bandwidth of about 150 Mbit/second (more specifically, about 155.52 Mbit/second). Such a bandwidth should be minimally sufficient to carry a broadband video service, such as high definition video, and various narrowband services, such as voice transmission.

Additionally, B-ISDN is expected to serve as a high speed data transport facility for interconnecting separate local area networks (LANs). For example, Ethernet based LANs, as well as other types of LANs, presently operated at a gross bit rate of about 10 Mbit/second. In a proposed LAN, a Fiber Distributed Data Interface (FDDI) is expected to operate at a gross bit rate of 125 Mbit/second (25 Mbit of which is used for encoding). Accordingly, a 150 Mbit/second bandwidth would be sufficient to interconnect a wide variety of LANs, including those in use and those being proposed.

Lastly, B-ISDN must fully accommodate relatively slow (e.g., 64 Kbit/second) ISDN traffic, such as that which occurs at the basic rate.

ISDN marries two different types of transport and switching technologies; namely, circuit and packet. Circuit switching inherently involves maintaining a continuous real time communication channel at the full channel bandwidth between two points to continuously permit the transport of information throughout the duration of the call. Unfortunately, due to this inherent characteristic of circuit switching, it is inefficient for carrying "bursty" data traffic and is therefore considered by most to be ill suited for use in B-ISDN. Specifically, many services contemplated for B-ISDN, having relatively low information transfer rates, will occur as periodic bursts when transmitted over a B-ISDN subscriber channel. Additionally, high speed data, such as that occurring over a LAN interconnection, will itself be bursty. Such bursty communications do not require full channel bandwidth at all times during the duration of the call. Thus, when circuit switched connection is used to carry bursty traffic, available communication bandwidth occurring between successive bursts in simply wasted.

Moreover, circuit switching is inflexible because the channel width is always the same. Thus, for example, a wide (e.g., 140 Mbit/second) channel would be used for all transmissions, even those requiring a very narrow bandwidth (e.g., 1 Kbit/second). In an attempt to solve the problem of wasted bandwidth occurring in circuit switching, multi-rate circuit switching was proposed. With multi-rate circuit switching, connections can have a bandwidth of a multiple of a basic channel rate (e.g., 1 Kbit/second). Although multi-rate circuit switching solves the problem of wasted bandwidth for services requiring only a narrow bandwidth, for services requiring a wide bandwidth, a number of multiple basic rate channels must be synchronized. Such synchronization becomes extremely difficult for wide bandwidth services. For example, a 140 Mbit/second channel would require synchronizing 140,000 1 Kbit/second channels. Moreover, multi-rate circuit switching includes the inherent inefficiencies of a circuit switch when bursty data is involved.

Multi-rate circuit switching having multiple "basic rates" has also been proposed. This circuit switching would include a 1 Kbit/second synchronizing channel, eight (8) 2 Mbit/second data (H1) channels, and one (1) 139.264 Mbit/second data (H4) channel. Unfortunately, the switch for multi-rate circuit switching is complex. Furthermore, the channel bandwidths are inflexible to meet new transmission rates. Moreover, much of the bandwidth might be idle when it is needed. For example, if all eight (8) H1 channels are occupied, the H4 channel cannot be used to establish an additional H1 connection. Thus, a 2,048 Mbit/second signal might not be able to be sent even though a 139.264 Mbit/second channel is available. Lastly, multiple basic rate circuit switching includes the inherent inefficiencies of a circuit switch when bursty data is involved.

In view of the above described problems with circuit switching, packet switched communications presently appear to be the preferred mode of communication over a B-ISDN service. Packet switching includes normal packet switching (e.g., X25) and fast packet switching (e.g., Asynchronous Transfer Mode or "ATM"). Normal packet switching assumes certain errors at each data link are probable enough to require complex protocols so that such errors can be controlled at each link. Link errors were a valid assumption and concern at one time. However, today data links are very reliable such that the probability of errors being introduced by data links are no longer of any concern.

ATM fast packet switching does not correct errors or control flow within the network (i.e., on a link-by-link basis). Instead, ATM is only concerned with three types of errors; namely bit errors, packet loss, and packet insertion. Bit errors are detected and/or corrected using end-to-end protocols. Regarding packet loss and insertion errors, ATM only uses prophylactic actions when allocating resources during connection set-up. That is, ATM operates in a connection-oriented mode such that when a connection is requested, a line terminal first checks whether sufficient resources (i.e., whether sufficient bandwidth and buffer area) are available. When the transfer of information is complete, the resources are "released" (i.e., are made available) by the line terminal. An ATM packet includes a header field (generally five (5) bytes) and a payload (or information) field (generally 48 bytes). The main function of the header is to identify a virtual connection to guarantee that the ATM packet is properly routed through the network. Switching and/or multiplexing is first performed on virtual channels and then on virtual paths. The relatively short length of the payload or information field reduces the size required for internal buffers at switching nodes thereby reducing delay and delay jitter.

Fast packet switching, such as ATM switching, has three main advantages. First ATM switching is flexible and is therefore safe for future transfer rates. Second, no resources are specialized and consequently, all resources may be optimally shared. Finally, ATM switches permit economies of scale for such a universal network.

ATM packets (cells) are routed through a network by means of a series of ATM switches. An ATM switch must perform three basic functions for point-to-point switching; namely, (i) routing the ATM cell, (ii) updating the virtual channel identifier (VCI) and virtual path identifier (VPI) in the ATM cell header, and (iii) resolving output port contention. The first two functions, namely routing and updating, are performed by a translation table belonging to the ATM switch. The translation table converts an incoming link (input port) and VCI/VPI to an outgoing link (output port) and VCI/VPI. An arbiter is used to resolve output port contention among two or more ATM cells destined for the same output port. The arbiter chooses an ATM cell which "wins" contention (i.e., which is applied to the output port). Other ATM cells contending for the output port "lose" contention (i.e., they must wait before being applied to the output port).

To prevent the ATM cells not winning contention for the output port from being lost, buffering is required. There are three basic buffering strategies; namely, pure input queuing, pure output queuing and central queuing. Pure input queuing provides a dedicated buffer at each input port. Arbitration logic is used to decide which inlet buffer will be next served. The arbitration logic may be simple e.g., round robin in which the inlet buffers are served in order, or random in which the inlet buffers are served randomly) or complex (e.g., state dependent in which the most filled buffer is served next, or delay dependent in which the globally oldest cell is served next).

Unfortunately, with input queuing, an ATM cell in the front of the queue waiting for an occupied output channel to become available may block other ATM cells behind it which do not need to wait. This is known as head-of-line (HOL) blocking. A post office metaphor has been used to illustrate head-of-line (HOL) blocking in the book, M. dePrycker, *Asynchronous Transfer Mode: Solution for Broadband ISDN*, pp. 133–137 (Ellis Horwood Ltd., 1991). In the post office metaphor, people (representing ATM cells) are waiting in a line (representing an input buffer for either a stamp window (a first output port) or an airmail window (a second output port). Assume that someone (an ATM cell) is already at the stamp window (the first output port) and that the first person in the line (the HOL of the input buffer) needs to go to the stamp window (the first output port). Assume further that no one is presently at the airmail window (the second output port) and that the second and third people in line (ATM cells behind the HOL cell in the input queue) want to go to the airmail window (the second output port). Although the airmail window (second output port) is available, the second and third people (ATM cells behind the HOL cell) must wait for the first person (the HOL cell) who is waiting for the stamp window (the first output port) to become free. Therefore, as the post office metaphor illustrates, the head-of-line (HOL) cell waiting for an output port to become free often blocks ATM cells behind it which would otherwise not have to wait. Simulations have shown that such head-of-line (HOL) blocking decreases switch throughput to about 58.6%.

Pure output buffering solves the head-of-line (HOL) blocking problems of pure input buffering by providing only the output ports with buffers. Since the ATM cells buffered at an output port are output in sequence (i.e., first in, first out, or "FIFO"), no arbitration logic is required. In the post office metaphor, the stamp window (first output port) has its own line first output buffer) and the airmail window (second line (second output buffer).

Although pure output buffering clearly avoids HOL blocking that may occur in pure input port buffering, it does have some disadvantages. Specifically, to avoid cell loss, assuming N input ports, the system must be able to write N ATM cells into any one of the queues (or output buffers) during one cell time (i.e., within 2.8 microseconds, where 2.8 microseconds is (53 bytes, 8 bits/byte) 155.52 Mbit/ second. Such a high memory write rate is necessary because it is possible that each of the ATM cells arriving at each of the input ports will require the same output port. This requirement on the memory speed of the output buffer becomes a problem as the size of the switch (i.e., as N) increases. Accordingly, for a 1024 by 1024 switch (i.e., a switch having 1024 inputs and 1024 outputs), pure output buffering is not feasible because the size of the output port buffers would have to be large enough to handle 1024 ATM cells.

Central queuing includes a queue not assigned to any inlet (input port) or outlet (output port). Each outlet will select ATM cells destined for it in a first in, first out (FIFO) manner. However, the outlets must be able to know which cells are destined for them. Moreover, the read and write discipline of the central queue cannot be a simple FIFO because ATM cells destined for different outlets are all merged into a single queue. Turning again to the post office metaphor, a single line (central queue) of people (ATM cells) are waiting to visit the stamp window (a first output port) or the airmail window (a second output port). As a window opens up (i.e., as an output port becomes available), a server searches the line (central queue) for the next person (ATM cell) needing the available window (requiring the available output port). The server brings that person (ATM cell) to the open window (available output port) regardless of whether the person (the ATM cell) is at the front of the line (HOL). As the post office metaphor illustrates, the central queue requires complex memory management system given the random accessibility required. Of course, the memory management system becomes more complex and cumbersome when the number of output ports (i.e., the size of the switch) increases.

In some instances, an ATM cell will have more than one destination. Broadcasting is defined as transmitting the ATM cell to all output ports. Multicasting is defined as transmitting the ATM cell to multiple output ports. Thus, broadcasting is a species of multicasting. If multicasting functionality is desired in addition to point-to-point switching, the ATM switch must also duplicate (or replicate) the ATM cell into two or more ATM cells. Furthermore, "call splitting" functionality is very desirable for multicasting ATM switches.

Call splitting permits a portion of ATM cells to be transmitted to available output ports while the remainder wait for an output port to become available. Without call splitting, all of the desired output ports would have to become available simultaneously before the ATM cells could be transmitted.

There are several approaches for designing a large-scale ATM switch. One approach uses small ATM switch modules (e.g., 32×32) as building blocks and connects them in a multi-stage structure (e.g., Close-type interconnection) (See, e.g., T. Kazoo, et al., "32*32 Shared Buffer Type ATM Switch VLSIs for B-ISDNs," *IEEE Journal On Selected Areas Of Communication*, Vol. 9, No 8, pp. 1239–1247 (Oct. 1991); Y. Shobatake et al., "A One-Chip Scaleable 8*8 ATM Switch LSI Employing Shared Buffer Architecture," *IEEE Journal on Selected Areas of Communication*, Vol. 9, No. 8, pp. 1248–1254 (Oct. 1991); T. R. Banniza et al., "Design and Technology Aspects of VLSIs for ATM Switches," *IEEE Journal on Selected Areas of Communication*, Vol. 9, No. 8, pp. 1255–1264 (Oct. 1991); A. Itoh et al., "Practical Implementation and Packaging Technologies for a large-scale ATM Switching System," *IEEE Journal on Selected Areas of Communication*, Vol. 9, No. 8, pp. 1280–1288 (Oct. 1991); and W. Fischer et al., "A Scalable ATM Switching System Architecture," *IEEE Journal on Selected Areas of Communication*, Vol. 9, No. 8, pp. 1299–1307 (Oct. 1991), each of which is expressly incorporated by reference herein). Unfortunately, with this approach, internal blocking in the switch modules (i.e., a "collision" of ATM cells within the switch fabric) degrades switch performance. The switch performance can be improved by increasing the speed of the internal links or providing more interconnection links between the small ATM switch modules. However, even with such improvements, this approach has not been proven to be capable of providing satisfactory performance for a large-scale ATM switch.

In a second approach, high-speed technology is used to switch cells at a multiple Gbit/second rate in a core switch (See K.Y. Eng et al., "A High Performance Prototype 2.5 Gbs ATM Switch for Broadband Applications," *Proc. ICC '89*, pp. 111–117 (June 1989); Y. Kato, et al., "A Development of a High Speed ATM Switching LSIC," *Proc. ICC '90*, pp. 562–566 (April 1990); K. Genda et al., "A 160 Gb/s ATM Switching System Using an internal Speed-Up Crossbar Switch," *Proc. GLOBECOM '94*, pp. 123–133 (Nov. 1994); and E. Munter, "A High Capacity ATM Switch Based On Advanced Electronic and Optical Technologies," *Proc. ISS '95*, Berlin, Germany, pp. 389–393 (April 1995), (each of which is expressly incorporated by reference herein). For instance, the switches discussed in the Eng, Kato, Genda, and Munter articles include switch cells operating at 2.5 Gbit/second or 10 Gbit/second. This second approach advantageously minimizes the buffer required in the core switch for two reasons.

First, because the collective traffic of all users is multiplexed to a high bandwidth link (e.g., 16 * 155.52 Mbit/second lines to a 2.5 Gbit/second line, or 64 * 155.52 Mbit/second lines to a 10 Gbit/second line, for example), the traffic of each individual user appears more random (i.e., less bursty). Second, when cells are multiplexed and switched at high speed, a channel grouping technique is applied implicitly and thus requires less buffering memory for the same performance.

However, with this second approach, demultiplexers at the output of the core switch require large buffers because high-speed cell streams are switched to lower speed output links. The need of large buffers, however, can be justified because the speed required for the demultiplexer's memory is lower than that of the memory of the core switch. Unfortunately, this second approach has two drawbacks. First, this second approach requires advanced technology devices. That is, inexpensive CMOS devices would not be adequate to implement this architecture. Thus, implementing this second approach requires expensive technology. Second, interconnecting the high speed links is more difficult.

As discussed above, output buffering (including shared-memory output buffering) has proven to provide the best delay and throughput performance. However, as the size of the ATM switch increases to a certain point (e.g., 256 input and output ports), memory speed may become a bottleneck or the technology used to implement such kind of memory may become too costly.

One way to eliminate the speed constraint of the memory is to temporarily store some cells destined for the same output port at the input buffers. The head-of-line (HOL) blocking drawback of input buffers (described above) can be improved by increasing the bandwidth of the internal links (e.g., 2 to 4 times the bandwidth of the input lines) and providing output buffers. Thus, the input-and-output buffering approach provides satisfactory performance while eliminating memory speed limitation. Examples of input-and-output buffered ATM switches are discussed in the Genda article and the Munter article which discuss a 160 Gbit/second switch. However, to implement input-and-output buffered switches, output port contention by input cells destined for the same output port must be resolved. Such output port contention resolution is usually handled by an arbiter. Unfortunately, using an arbiter to resolve output port contention creates a bottleneck. Thus, such input and output buffered switches merely shift the bottleneck caused by the memory speed to the arbiter. A large-scale switch with adequate performance will only be possible if parallel processing and pipeline techniques can be intelligently applied to the design of the arbiter.

Several output contention resolution algorithms have been proposed, such as a recirculation algorithm (See, e.g., Huang et al., "STARLITE: A Wideband Digital Switch," *Proceedings of GLOBECOM '84*, pp. 121–125 (Dec. 1984)), a three phase algorithm (See, e.g., Hui et al., "A Broadband Packet Switch for integrated Transport," *IEEE Journal on Selected Areas of Communication*, Vol. 5, No. 8, pp. 1264–1273 (Oct. 1987)), a ring reservation algorithm (See, e.g., Bingham et al., "Reservation-Based Contention Resolution Mechanism for Batcher-Banyan Packet Switches," *Electronics Letters*, Vol. 24, No. 13, pp. 772–773 (June 1988)), and a centralized contention resolution device (See, e.g., Cisneros et al., "A Large ATM Switch Based on Memory Switches and Optical Star Couplers," *IEEE Journal on Selected Areas Of Communication*, Vol. 9, No. 8, pp. 1348–1360 (Oct. 1991)). Unfortunately, most of these output contention resolution algorithms can only handle unicast calls (i.e., point-to-point communication) and N-to-1 selection.

The inventor of the present invention describes an ATM switch employing output port buffering in U.S. Pat. No. 5,179,552 entitled "Crosspoint Matrix Switching Element for a Packet Switch" (hereinafter "the '552 patent"). The switch described in the '552 patent permits the ATM cells at L*M of N input ports to go to a switch module, where M is the group size and L is the expansion ratio that is required to have satisfactory cell loss rates. For instance, for a group size of 32, 64 routing links are required, meaning up to 64 cells destined for 32 output ports share the routing links. Although no arbiter is necessary, cell loss can occur. This switch groups L*M routing links to be shared by all input ports. Unfortunately, to minimize the probability of cell loss, the number of routing links in each group has to be relatively large. This, in turn, increases the number of switching elements. The switch of the '552 patent has cell loss in the switch fabric when there are more than L*M cells destined for one same output group. The cell loss rate can be unacceptable for some input traffic patterns (e.g., correlated input traffic distribution). Moreover, the switch of the '552 patent does not have an multicasting functionality, but rather, can only service point-to-point switching.

In an article by one of the present inventors, a recursive modular architecture for implementing a large-scale ATM switch was proposed (See Chao, "A Recursive Modular Terabit/Sec ATM Switch," *IEEE Journal on Selected Areas of Communication*, Vol. 9, No. 8, pp. 1161–1172 (Oct. 1991)). This architecture was later modified by the present inventors to permit multicasting (See Chao et al., "Design and Analysis of a Large-Scale Multicast Output Buffered ATM Switch," *IEEE/ACM Trans. on Networking*, Vol. 3, No. 2, pp. 112–138 (April 1995) (hereinafter, "the MOBAS article")).

In the MOBAS article, the present inventors demonstrated that a switch designed to meet the performance requirements for unicast calls, will also satisfy the performance requirements of multicast calls. Both of the ATM switch architectures discussed in the Chao article and the MOBAS article employ a generalized Knockout concept (See, e.g., Eng et al., "A Growable Packet (ATM) Switch Architecture: Design Principles and Applications," *IEEE Trans. on Communications*, Vol. 40, No. 2, pp. 112–138 (April 1995)) with output buffers. Unfortunately, the switch fabric in each of the ATM architectures discussed in the Chao article and the MOBAS article may discard cells when the number of routing links is less than the number of incoming cells destined for the same output port or output group. Thus, these ATM architectures are "lossy", i.e., cells are lost. To minimize such losses to a statistically acceptable level, the number of routing links in a group must be increased. For example, as discussed above with respect to the '552 patent, to minimize the probability of cell loss in a 1024 by 1024 ATM switch, the number of routing links in each group had to be relatively large (e.g., 64 for a group size of 32). Also, as discussed above with respect to the '552 patent, the cell loss rate may be high when traffic from input ports are correlated.

SUMMARY OF THE PRESENT INVENTION

The object of the present invention is to provide an ATM switch architecture which permits multicasting and which overcomes the aforementioned problems of known devices to permit high performance, large scale switching, without requiring exotic and costly technology. The present invention achieves this objective by providing a new architecture to implement a scaleable multicast ATM switch with input and output buffers. The switch of the present invention includes a nonblocking memoryless switch fabric followed by small switch modules at the output ports.

Cell replication, cell routing, output contention resolution, and cell addressing are all performed distributively. Accordingly, the switch of the present invention can be scaled up to provide thousands of input and output ports. The switch of the present invention can be implemented by a traditional economic CMOS technology while achieving comparable system performance with those switches discussed in the Eng, Kato, Genda, and Munter articles.

The switch of the present invention has a regular structure and thus has the advantages of: (1) easy expansion; (2) relaxed synchronization for data and clock signals; and (3) ability to build the switch fabric using existing CMOS technology.

The present invention also provides a novel algorithm to resolve output port contention while achieving input port buffer sharing, fairness among the input ports, and multicast call splitting (See, e.g., C. K. Kim et al., "Call Scheduling Algorithms in a Multicast Switch", *IEEE Trans. on Communications* Vol. 40, No. 3, pp. 625–635 (March 1992)). The present invention may provide a call splitting function which allows a multicast cell to be delivered to subsets of destined output ports in multiple cycles, thereby increasing the system throughput. By applying distributed and parallel processing techniques, the architecture of the present invention can accommodate a large-scale switch. Our algorithm can handle multicast calls, call splitting, and N-to-multiple selection for channel grouping function. Our switch adopts the channel grouping concept (See, e.g., Pattavina, "Multichannel Bandwidth Allocation in a Broadband Packet Switch," *IEEE Journal on Selected Areas Of Communications*, Vol. 6, No. 9, pp. 1489–1499 (Dec. 1988)) to reduce the hardware complexity and improve its throughput. The channel grouping concept bundles multiple output ports and permits them to share routing links. Moreover, by using its unique arbitration procedure, the switch of the present invention is able to acceptably minimize the probability of cell loss with a smaller number of routing links in each group. This permits commercially available 32 by 32 switching modules to be used.

The present invention solves the aforementioned problems by providing a switch for routing cells from a plurality of input ports to a plurality of output ports, having novel input port controllers and novel routing modules.

Each of the input port controllers has a cell input for receiving cells from an associated input port, a plurality of feedback inputs, and a cell output. Further, each of the input port controllers terminates a line of the associated input port. Each of the input port controllers also buffers a cell received at the associated input port. Furthermore, each of the input port controllers stores a local priority value and a multicast pattern based on information included in the cell received at the associated input port. Each of the input port controllers also compares each of a plurality of feedback priority values, provided at the plurality of feedback inputs, with the stored local priority value to form a set of comparison results and updates the multicast pattern based on the set of comparison results. Lastly, each of the input port controllers applies either a next cell received at the associated input port or the cell buffered to the cell output, based on the updated multicast pattern.

The routing modules route cells to one of a plurality of output groups. Each of the routing modules has a plurality of inputs, each of which is coupled with the cell output of a corresponding input port controller, an address generator for generating addresses corresponding to a group of associated output ports, and an array of switch elements. Each of the switch elements has a first input, a second input, a first output and a second output. The array of switch elements includes a first row of switch elements, a last row of switch elements, a first column of switch elements, a last column switch elements, and an internal array of switch elements not belonging to any one of the first row, the last row, the first column, and the last column. Each of the switch elements of the first row has its second input provided with one of the addresses generated by the address generator and its second output coupled with the second input of a corresponding switch element in an adjacent row. Each of the switch elements of the first column has its first input coupled with the cell output of an associated input port controller and has its first output coupled with the first input of a corresponding switch element in an adjacent column. Each of the switch elements of the last row has its second output coupled with an associated output of the routing module and has its second input coupled with the second output of an associated switch element in an adjacent row. Each of the switch elements of the last column has its first input coupled with the first output of an associated switch element in an adjacent column. The second output of the switch element belonging to both the last row and the last column provides a feedback priority value which is applied to an associated feedback input in each of the input port controllers. Each of the switch elements belonging to the internal array has its first input coupled with the first output of an adjacent switch element of a preceding column, and its second input coupled with the second output of an adjacent switch element of a preceding row. Each of the switch elements have a toggle state in which its first input is coupled with its second output and its second input is coupled with its first output, and a cross state in which its first input is coupled with its first output and its second input is coupled with its second output. Each of the switch elements assume the toggle state when address information of a cell applied at its first input matches address information applied to its second input and priority information of the cell applied at its first input is higher than priority information applied at its second input Otherwise, the switch element assumes the cross state.

In a small scale implementation (such as 64 inputs by 64 outputs, for example), the switch further includes a plurality of output buffers, each of which is coupled with the outputs of an associated routing module.

In a larger scale implementation such as 256 inputs by 256 outputs, for example), the switch further includes a plurality of translation devices, a plurality of small switch modules, and a plurality of output port controllers. Each of the translation devices has an input coupled with an associated output of an associated routing module, and an output. Each of the translation devices updates routing information to provide updated routing information to its output. Each of the small switch modules has a plurality of inputs, each of which is coupled with the output of a corresponding translation device associated with a corresponding routing module. Further, each of the small switch modules routes data applied to any of its inputs to one of a plurality of outputs. Each of the plurality of output port controllers has an input coupled with a corresponding one of the outputs of an associated small switch module.

A preferred embodiment of the larger scale implementation of the switch includes N input port controllers, K routing modules having L times M outputs, K times L times M translation devices, K small switch modules, and N output port controllers, where K equals N divided by M and where L is a function of M and a required minimum throughput value.

In the switches of the present invention, a temporal delay caused by the routing module is less than one cell time, where one cell time is defined as the number of bits of a cell divided by a transmission rate of a network of which the switch is a part.

Also, in the switches of the present invention, each of the routing modules provides output port contention resolution.

In a very large implementation (such as 1024 inputs by 1024 outputs, for example), the present invention provides a switch for routing cells from a plurality of input ports to a plurality of output ports, the switch having a plurality of input port controllers, a plurality of multicast grouping networks, and a plurality of concentrators. Each of the plurality of input port controllers are similar to the input port controllers described above.

Each of the plurality of multicast grouping networks includes a plurality of inputs coupled with the cell output of a corresponding input port controller, a plurality of outputs, and a plurality of routing modules for routing cells to one of a plurality of outputs.

Although, the routing modules are similar to those discussed above, they do not provide a priority feedback in this very large scale architecture. Each of the plurality routing modules includes plurality of inputs, each of which is coupled with a corresponding input of an associated multicast grouping network. Each of the routing modules also includes an address generator for generating addresses corresponding to a group of associated output ports. Lastly, each of the routing modules includes an array of switch elements, each of the switch elements having a first input, a second input, a first output and a second output. The array of switch elements includes first row of switch elements, a last row of switch elements, a first column of switch elements, a last column switch elements, and an internal array of switch elements not belonging to any one of the first row, the last row, the first column, and the last column. Each of the switch elements of the first row has its second input provided with one of the addresses generated by the address generator and its second output coupled with the second input of a corresponding switch element in an adjacent row. Each of the switch elements of the first column has its first input coupled with the cell output of an associated input port controller and its first output coupled with the first input of a corresponding switch element in an adjacent column. Each of the switch elements of the last row has its second output coupled, via an associated output of the routing module, with an associated output of the associated multicast grouping network, and its second input coupled with the second output of an associated switch element in an adjacent row. Each of the switch elements of the last column has its first input coupled with the first output of an associated switch element in an adjacent column. Each of the switch elements belong to the internal array has its first input coupled with the first output of an adjacent switch element of a preceding column, and its second input coupled with the second output of an adjacent switch element of a preceding row.

Each of the switch elements has a toggle state in which its first input is coupled with its second output and its second input is coupled with its first output, and a cross state in which its first input is coupled with its first output and its second input is coupled with its second output. Each of the switch elements assume the toggle state when address information of a cell applied at its first input matches address information applied to its second input and priority information of the cell applied at its first input is higher than priority information applied at its second input; otherwise it assumes the cross state.

The concentration modules are similar to the routing modules. However, they do not include address broadcasters and they do include priority feedback. Specifically, each of the concentration modules includes a plurality of inputs coupled with associated outputs of each of the multicast grouping networks and having an array of switch elements. Similar to the routing modules, each of the switch elements has a first input, a second input, a first output and a second output. The array of switch elements includes first row of switch elements, a last row of switch elements, a first column of switch elements, a last column of switch elements, and an internal array of switch elements not belonging to any one of the first row, the last row, the first column, and the last column. Each of the switch elements of the first row has its second output coupled with the second input of a corresponding switch element in an adjacent row. Each of the switch elements of the first column has its first input coupled with an associated input of that concentration module and has its first output coupled with the first input of a corresponding switch element in an adjacent column. Each of the switch elements of the last row has its second output coupled with an associated output of the concentration module, and has its second input coupled with the second output of an associated switch element in an adjacent row. Each of the switch elements of the last column has its first input coupled with the first output of an associated switch element in an adjacent column. The second output of a switch element in both the last row and last column applies a feedback priority signal to an associated feedback input in each of the plurality of input port controllers. Each of the switch elements belong to the internal array has its first input coupled with the first output of an adjacent switch element of a preceding column, and its second input coupled with the second output of an adjacent switch element of a preceding row.

Each of the switch elements has a toggle state in which its first input is coupled with its second output and its second input is coupled with its first output, and have a cross state in which its first input is coupled with its first output and its second input is coupled with its second output. Each of the switch elements assume the toggle state when priority information of the cell applied at its first input is higher than priority information applied at its second input; otherwise, it assumes the cross state.

In a preferred embodiment of the very large scale switch, a plurality of translation devices, a plurality of small switch modules, and a plurality of output port controllers are also provided. Each of the translation devices has an input coupled with an associated output of an associated concentration module. Each of the translation devices updates routing information to provide updated routing information to an output. Each of the small switch modules has a plurality of inputs, each of which is coupled with the output of a corresponding translation device associated with a corresponding routing module. Each of the small switch modules route data applied to any of its plurality of inputs to one of a plurality of outputs. Each of the output port controllers has an input coupled with a corresponding output of an associated small switch modules.

A preferred embodiment of the very large scale implementation of the switch includes N input port controllers, K1 multicast grouping networks, each having L times M times K2 outputs, K2 concentration modules, K2 times L times M translation devices, K2 small switch modules, and N output port controllers, where K2 equals N divided by M and where L is a function of M and a required minimum throughput value.

Each of the switches of the present invention includes multicasting functionality and arbitrates output port contention of the cells having an associated priority value and a multicast bit pattern. A head-of-line cell applied at an input port controller is buffered and transmitted to the routing modules. The routing modules route incoming cells, transmitted from each of the input port controllers, to an associated one of K groups of output ports. Each of the routing modules also provides a feedback priority value, based on a priority value associated with a lowest priority cell passed to the associated group of output ports.

In general, the present invention provides an arbitration method in which, at the beginning of each time slot, each input port controller (IPC) sends its head-of-line (HOL) cell to a multicast grouping network (MGN) and also buffers this cell (e.g., in a one cell sized storage device). After cells have traversed the switching array of the routing modules (RMs) feedback priority information $FP_1$ to $FP_k$ (i.e., the priority of the rightmost link in each of the K RMs, is fed back to every input port controller (IPC). Each input port controller (IPC) then compares the feedback priority level $FP_j$ (j=1,2, ... K) with a local priority level (i.e., the priority level of the buffered cell).

Three comparison results are possible. First, the $j^{th}$ bit of the head-of-line (HOL) cells multicast pattern can be equal to "Ø" ($MP_j=\emptyset$), which indicates that the head-of-line cell is not destined for the j-th output group. In this case, the $MP_j$ bit remains "Ø". Second, the $j^{th}$ bit of the head-of-line (HOL) cells multicast pattern can be equal to "1" ($MP_j=1$), and the local priority value (LP) can be less than or equal to the feedback priority from the $j^{th}$ routing module ($FP_j$) (recall that the smaller the priority value, the higher the priority level), which indicates that the head-of-line (HOL) cell is destined for the $j^{th}$ output group and has been successfully routed through the $j^{th}$ routing module ($RM_j$). In this case, the $j^{th}$ bit of the multicast pattern ($MP_j$) is set to "Ø". Third, the $j^{th}$ bit of the multicast pattern ($MP_j$) can be set to "1" and the local priority (LP) can be greater than the feedback priority from the $j^{th}$ routing module ($FP_j$), which indicates that the head-of-line (HOL) cell destined for the $j^{th}$ output group was unsuccessful (i.e., was discarded) by the $j^{th}$ routing module ($RM_j$). In this case the $j^{th}$ bit of the multicast pattern ($MP_j$) remains "1".

After all of the bits of the multicast pattern $MP_j$ (j=1,2 ... K) have been updated based on one of the three results, a "resend" signal, which is initially set to "Ø" and which indicates that the head-of-line (HOL) cell must be retransmitted when asserted, is set to "1" (asserted) if any one of the K bits of the multicast pattern is set to "1". If, on the other hand, each of the K bits of the multicast pattern are "Ø", which indicates that the head-of-line (HOL) cell has been successfully transmitted to all necessary output groups, the "resend" signal will remain "Ø" (i.e., will not be asserted). In this case, the input port controller (IPC) will clear the head-of-line (HOL) cell from the one cell buffer and will transmit and buffer the next cell (if any exists in the next time slot.

More specifically, the arbitration method first sets an output group index to one and a resend bit to a low state. Next, whether the output group index is less than or equal to the total number K of output groups is determined. If the output group index is less than or equal to the total number of output groups, whether a bit of the multicast pattern of the head-of-line cell, associated with the output group index, is set to a high state is determined. If the bit of the multicast pattern is not set to the high state, the output group index is incremented by one, and the step of determining whether the output group index is less than or equal to the total number K of output groups is again performed and the steps following this step are repeated. If the bit of the multicast pattern of the head-of-line cell, associated with the output group index, is set to the high state, whether the priority value of the head-of-line cell is less than or equal to the feedback priority value from a routing module associated with the output group index is determined. If the priority value of the head-of-line cell is less than or equal to the feedback priority value from the routing module associated with the output group index, the bit of the multicast pattern of the head-of-line cell, associated with the output group index, is set to the low state, the output group index is incremented by one, and the step of determining whether the output group index is less than or equal to the total number K of output groups is again performed and the steps following this step are repeated. If the priority value of the head-of-line cell is not less than or equal to the feedback priority value from the routing module associated with the output group index, the resend bit is set to the high state, the output group index is incremented by one, and the step of determining whether the output group index is less than or equal to the total number K of output groups is again performed and the steps following this step are repeated. Lastly, if the output group index was not determined to be less than or equal to the total number K of output groups, whether the resend bit is set to the high state or the low state is determined. If the resend bit is determined to be set to the high state, the head-of-line is retransmitted. If the resend bit is determined to be set to the low state, the head-of-line cell is cleared from the buffer, and a next in line cell is buffered and transmitted from the input port controller to the routing modules.

BRIEF DESCRIPTION OF THE DRAWINGS

FIGS. 2(a–c) illustrate the cross and toggle states, respectively, of a switch element used in the multicast grouping network.

DETAILED DESCRIPTION

Figure 1:
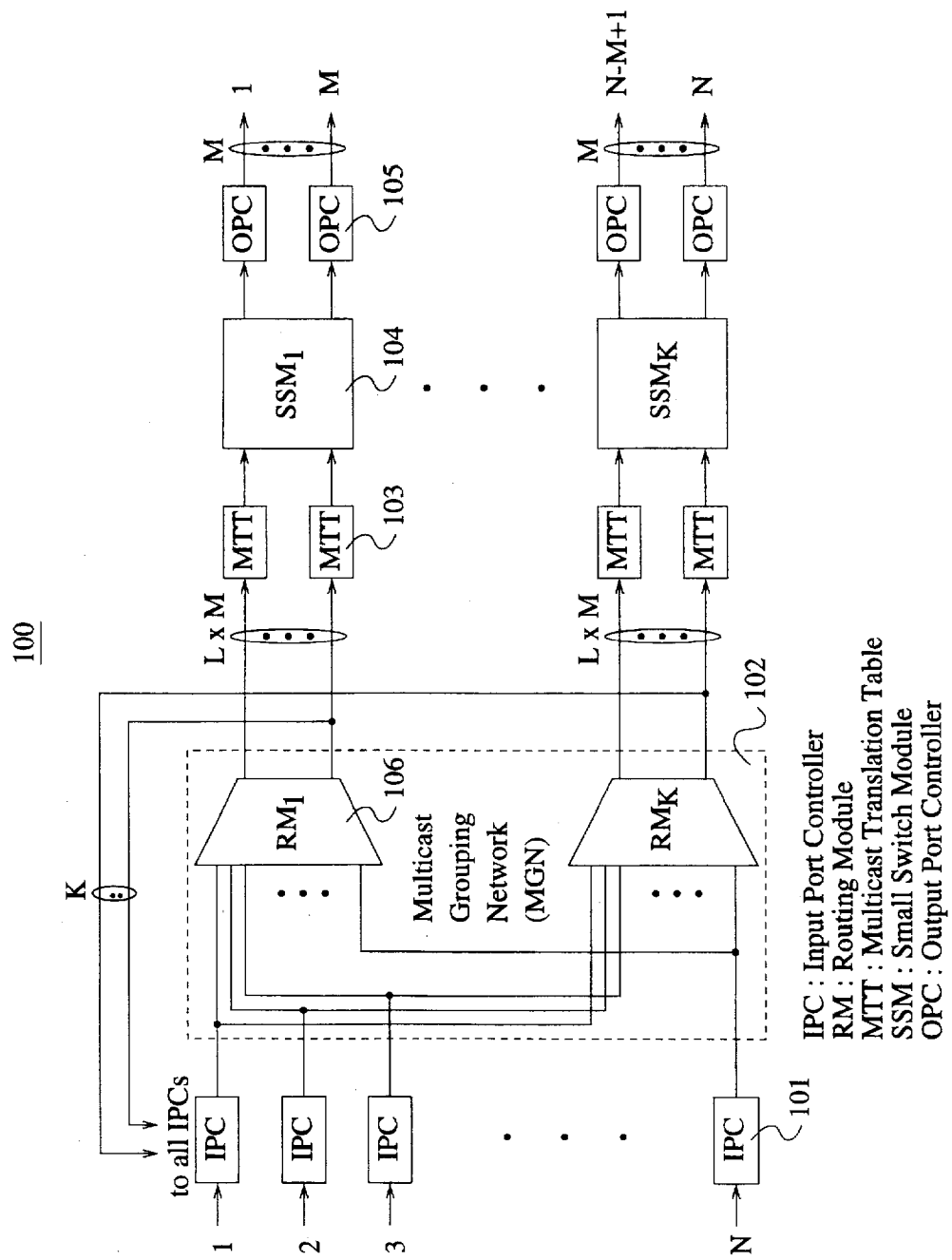
FIG. 1 is a block diagram which illustrates the architecture of our new ATM switch.

As shown FIG. 1, our ATM switch 100 includes input port controllers 101 (IPCs), a multicast grouping network 102 (MGN), multicast translation tables 103 (MTTs), small switch modules 104 (SSMs), and output port controllers 105 (OPCs). Each of N input port controllers (IPCs) 101 are coupled with each of the K routing modules (RMs) 106 of the multicast grouping network (MGN) 102. Moreover, each of the K routing modules (RMs) has a feedback line coupled with each of the input port controllers (IPCs) 101. The L×M output lines of each of the K routing modules (RMs) are coupled, via associated multicast translation tables (MTTs) 103, with an associated one of K small switch modules (SSMs) 104.

Figure 2:
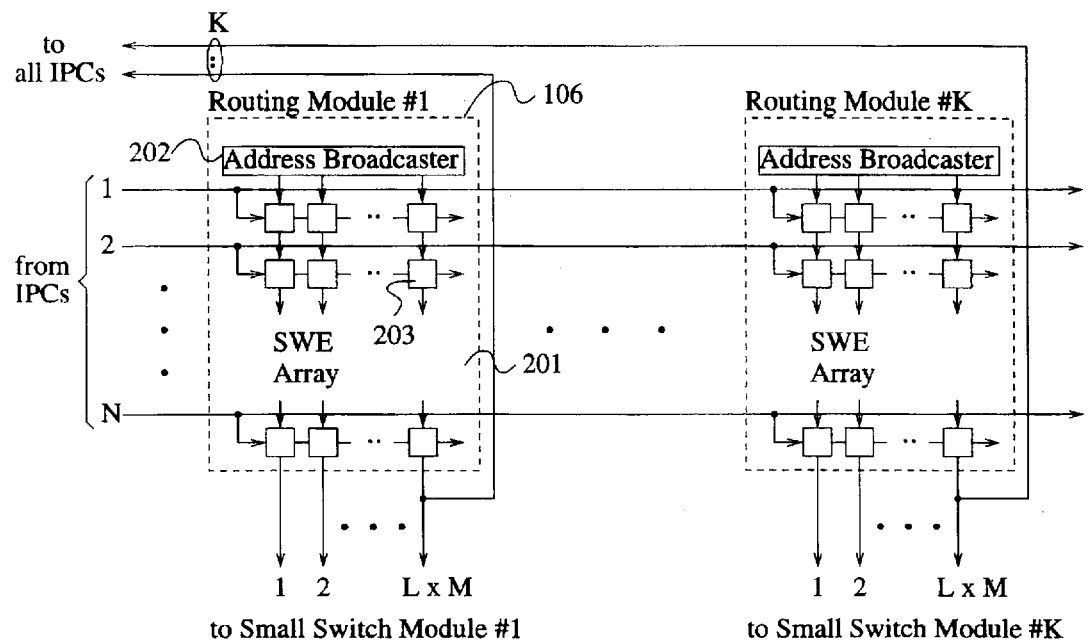
FIG. 2(a–c) is a block diagram which illustrates a multicast grouping network used in the new ATM switch of FIG. 1.
Figure 2:
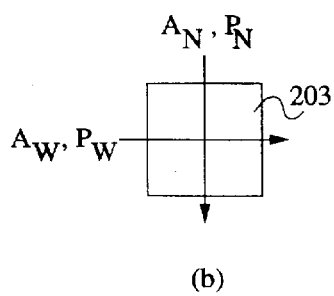
Figure 2:
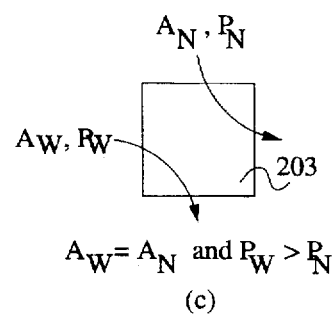

The ATM switch 100 replicates and routes ATM cells simultaneously. Cells are replicated by broadcasting incoming cells to all routing modules 106 (RMs), which then selectively route cells to their output links. As shown in FIG. 2a, within each of the K routing modules (RMs) 106, cell routing is performed distributively by an array 201 of switch elements 203 (SWEs). The concept of sharing routing-links (also called channel grouping) (See the Pattavina article) is also applied to construct the multicast grouping network MGN 102 to reduce hardware complexity, where every M output ports are bundled in a group. For a switch size of N input ports and N output ports, there are K output groups (K=N/M). The multicast grouping network MGN 102 consists of K routing modules 106. Each of the routing modules 106 provides L*M routing links to each output group. L is the ratio of required routing links to the group size (known as "group expansion ratio"). A simulation, for example, may be used to determine a value of L where 95% throughput is obtained for a given value of M. Therefore, L is a function of M and of a required throughput. (See e.g., S. C. Liew et al., "Comparison of buffering strategies for asymmetric packet switch modules", *IEEE Journal on Selected Areas of Communications*, Vol. 9, no. 3, pp. 428–438 (April 1991)). Cells from the same virtual connection can be arbitrarily routed to any one of the L*M routing links.

Figure 5:
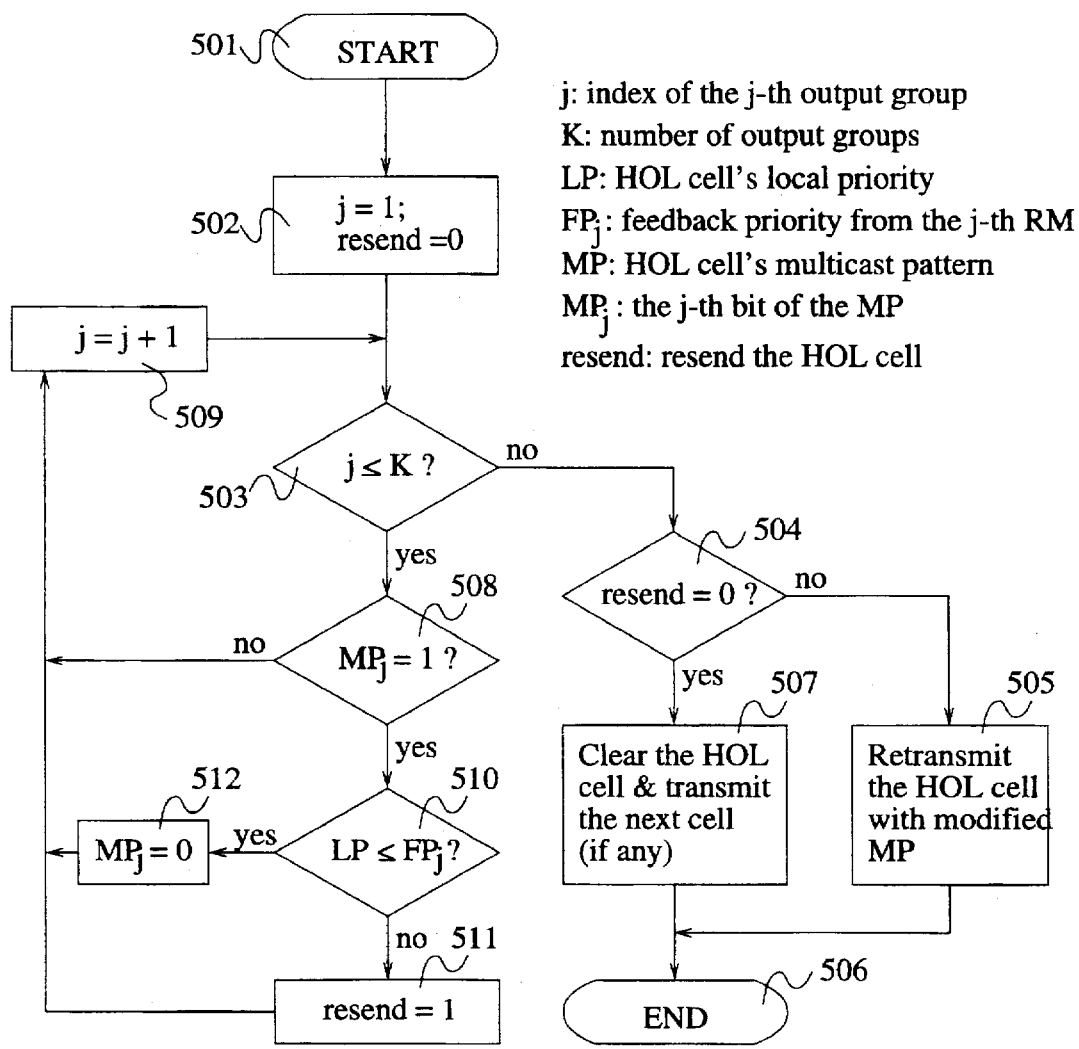
FIG. 5 is a flow diagram which illustrates our new multicast output contention resolution algorithm.

Based on a novel arbitration mechanism described below with reference to FIG. 5, up to L , M cells from N input port controllers 101 can be chosen for output in each routing module 106. Cells that lose contention are temporarily stored in an input buffer and will contend for output in the next time slot. On the other hand, cells that are successfully routed through the routing modules 106 will further be routed to proper output port(s) through the small switch modules (SSMs) 104.

As discussed above, the group expansion ratio L can be determined such that the required maximum throughput in a switch fabric can be achieved. Simulations of the performance of the ATM switch of the present invention showed that the larger the number (M) of output ports bundled into a group is, the smaller L is required to be to achieve the same maximum throughput. For instance, for a group size M of 16 and input traffic with an average burst length (i.e., the number of cells transmitted at the peak rate) of 15 cells, L has to be at least 1.25 to achieve a maximum throughput of 0.95. But, for a group size M of 32 and the same input traffic characteristic, L has to be at least 1,125 to achieve the same throughput.

The input port controllers (IPCs) 101 terminate input signals from the network, look up necessary information (such as VCI and VPI, for example) in a translation table, resolve contention among cells that are destined to the same output group, buffer those cells losing contention, and attach routing information in front of cells so that they can be routed properly in the multicast grouping network (MGN) 102. (See description of FIG. 7 below.)

Each routing module 106 (RM) in the multicast grouping network (MGN) 102 contains a two-dimensional array 201 of switch elements (SWEs) 203 and an address broadcaster 202 (AB), as shown in FIG. 2a. Using a highway metaphor to illustrate the operation of the routing module 106 (RM), the array 201 of switch elements 203 routes incoming cells (cars) from the N input port controllers (IPCs) 101 (entrance ramps). Each of the switch elements (SWEs) 203 has two states; namely a cross state and a toggle state. As shown in FIG. 2b, when a switch is in the cross state, a cell (car) from the north continues south and a cell (car) from the west continues east. As shown in FIG. 2c, when a switch is in the toggle state, the cell (car) from the north is diverted to the east and the cell (car) from the west is diverted to the south. The state of each of the switch elements (SWEs) 203 is determined by comparing the address bits and priority bits of the cell (car) from the west with those of the cell (car) from the north. Specifically, as shown in FIGS. 2b and 2c, the north cell has an address value $A_N$ and a priority value $P_N$ while the west cell has an address value $A_w$ and a priority value $P_w$. If $A_w=A_N$ and $P_w>P_N$, then the switch element 103 assumes the toggle state (See FIG. 2c), but otherwise assumes the cross state (See FIG. 2b).

The address broadcaster (AB) 202 generates "dummy cells" (dummy cars) that carry proper output group addresses. Thus, the switch element 203 does not need to store the output group address thereby significantly simplifying the circuit complexity of each of the switch elements (SWEs) 203. As a result, higher VLSI integration density is possible. The detailed operations of the switch elements (SWEs) 203 and the address broadcaster (AB) 202 can be found in the Chao and MOBAS articles and in the U.S. Pat. No. 5,179,552 (which are expressly incorporated herein by reference).

In addition to routing cells, the routing modules (RMs) 106 also sort the priority of the cells to implement a new multicast contention resolution algorithm described below with reference to FIG. 5. Our new multicast contention resolution algorithm achieves fairness among input ports during cell contention for an output port. As shown in FIG. 2a, each routing module (RM) 106 in the multicast grouping network (MGN) 102 has N horizontal input lines and L*M vertical routing links. These routing links are shared by the cells destined for the same output group i.e., the same small switch module 104). Each input line is connected to all routing modules (RMs) 106 whereby cells from any input line can be broadcast to all K output groups.

Cells from multicast calls are first replicated and routed by the multicast grouping network 102 to multiple small switch modules (SSMs) 104. Before the copied cells are further replicated and routed by the small switch modules (SSMs) 104, their routing field will be updated by the multicast translation tables (MTTs) 103 with proper information to be used by the small switch modules (SSMs) 104. Each of the small switch modules (SSMs) 104 has L*M inputs and M outputs. The small switch modules (SSMs) 104 must have multicast capability and high delay throughput performance. One example for such small switch modules 104 is Hitachi's 32 * 32 shared-buffered ATM switch (See the Kazoo article). The output port controllers 105 (OPCs) update each multicast cell with a new virtual channel identification and virtual path identification (VCI/VPI) and send the cell to the network.

Figure 3:
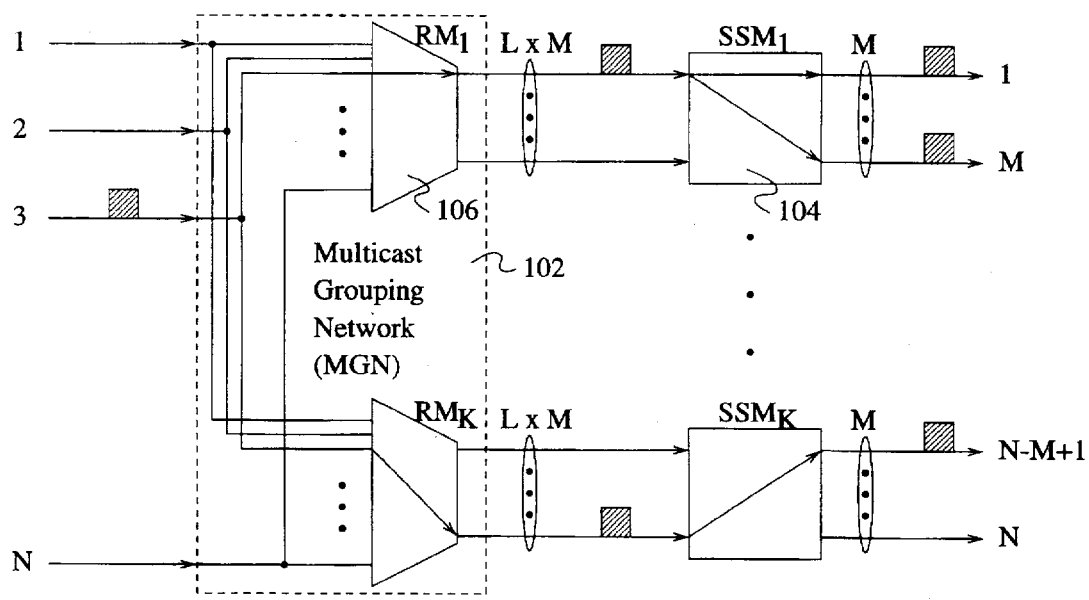
FIG. 3 is a block diagram which illustrates how the ATM switch of FIG. 1 routes a multicast cell.

FIG. 3 is a block diagram illustrating how a cell is replicated in the multicast grouping network (MGN) 102 and the small switch modules (SSMs) 104. Suppose a cell arrives at input port number 3 and is to be multicast to three output ports: 1, M, and (N−M+1). The cell is first broadcast to all K routing modules (RMs) 106 in the multicast grouping network (MGN) 102, but only the first and k-th routing modules (RM$_1$ and RM$_k$) 106 accept the cell. Recall that if the address $A_w$ of the cell from the input port controller does not equal the address $A_N$ provided by the address broadcaster 202, then the switch assumes the cross state (See FIG. 2b) and therefor, the cell will not be broadcast by routing modules having a different address. Note that only one copy of the cell will appear at the output of each of the first and k-th routing modules (RM$_1$ and RM$_k$) 106, and the copy of the multicast cell can appear at any one of the L*M links.

The copied cell at the output of the first routing module 106 RM$_1$ is further replicated into two copies by the associated (i.e., the first) small switch module (SSM$_1$) 104. Thus, a total of three replicated cells are provided at the output ports of the small switch modules (SSMs) 104.

Figure 4:
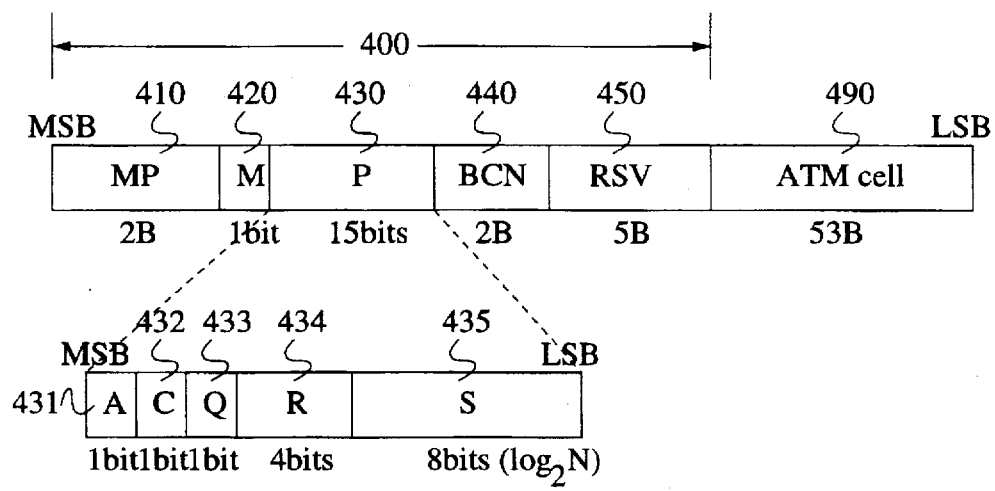
FIG. 4 is a cell diagram which illustrates routing information used by the ATM switch of FIG. 1.

FIG. 4 is a bit diagram which illustrates routing information stored in the header of an ATM cell for use by a multicast ATM switch with N=256 input and output ports and M=16 output ports per group. The routing information stored in the header of an ATM cell includes several fields; namely: a two (2) byte multicast pattern (MP) field 410, a multicast bit (M) 420, a 15 bit priority field (P) 430, and a 2 byte broadcast channel number field (BCN) 440. Five bytes RSV 450 are reserved for future growth.

The multicast pattern (MP) field 410 is a bit map of all the output groups and is used in the multicast grouping network (MGN) 102 for routing cells to multiple output groups. Each bit indicates if the cell is to be sent to the associated output group. For example, if the i-th bit in the multicast pattern (MP) field 410 is set to "1", the cell is to be sent to the i-th output group. The multicast pattern (MP) field 410 has K bits for a multicast grouping network (MGN) 102 having K output groups. For a unicast call, its multicast pattern is basically a "flattened" output address (i.e., a decoded output address) in which only one bit is set to "1" and all other (K−1) bits are set to "0". For a multicast call, more than one bit is set to "1" in the multicast pattern MP field 410. For instance, if a cell is to be multicast to output groups i and j, the i-th and j-th bits in the multicast pattern MP field 410 are set to "1" and the other bit are set to The priority field (P) 430 is used to facilitate output port contention resolution and can be flexibly set to any value to achieve desired (e.g., round robin, random, state dependent, or delay dependent, or a hybrid of the above, for example) service preference. For instance, the priority field (P) 430 may include an activity bit (A) 431, a call priority bit (C) 432, a buffer state priority bit (Q) 433, a four bit retry priority field (R) 434, and an input port priority byte (S) 435. The activity bit (A) 431 indicates the validity of the cell. The call priority bit (C) 432 indicates the priority of the virtual connection, which can be determined during the call setup or service provisioning. For example, the call priority bit (C) 432 might be set for a "911" call. The buffer state priority bit (Q) 433 provides a sharing effect among N input buffers by allowing the head-of-line (HOL) cell in an almost-overflowed buffer (e.g., exceeding a predetermined threshold) to be transmitted sooner thereby reducing the overall cell loss probability. Thus, this information permits "state dependent" arbitration logic to be applied to the input port buffers. The retry priority bits (R) 434 provide global first-come-first-served (FCFS) discipline, allowing a priority level of a cell to move up by one each time the cell loses contention. The retry priority bits (R) 434 may be stored in a count down register in the input port controller. (See e.g., element 715 of FIG. 7.) To achieve fairness among input ports, the priority levels of the head-of-line (HOL) cells at the input ports dynamically change at each time slot. In the following, it is assumed that the smaller the priority value, the higher the priority level. The activity bit (A) 431 is set to "0" if the cell is valid and set to "1" otherwise. The retry priority bits (R) 434 are initially set to "1111" and are decremented each time contention is lost (See the description of the input port controller with reference to FIG. 7 below). The input port priority byte (S) 435 can initially be set to its input port address with $\log_2 N$ bits and decreased by one at every time slot, thereby achieving round-robin fairness (See the description of the input port controller with reference to FIG. 7 below).

The broadcast channel number bytes (BCN) 440 in FIG. 4 is used by the multicast translation tables (MMTs) 103 to find a new multicast pattern, thereby allowing the copied cell to be further duplicated in the small switch module (SSM) 104. The broadcast channel number bytes (BCN) 440 are also used by the output port controllers (OPCs) 105 to find a new virtual channel indentification/virtual path identification (VCI/VPI) for each copy of the replicated cell.

Below, our novel algorithm is described with reference to FIG. 5. Our novel algorithm resolves output port contention among input ports fairly, handles multicast calls with a call splitting feature, and applies distributed and parallel processing techniques to accommodate a large-scale switch. In general, in an ATM switch having input queuing, resolving output port contention among the incoming cells destined for the same output port is necessary before such cells are transmitted to the routing network. Output port contention resolution is often implemented by a device called an arbiter.

Most proposed arbiters can only handle unicast calls i.e., point-to-point communication) and N-to-1 selection, for example: three phase (See, e.g., the Hui article), ring reservation (See, e.g., the Bingham article), and centralized contention resolution device (See, e.g., the Cisneros article). In unicast calls, for the input ports to determine whether their cell won contention, a cell appearing at an output port would only have to be compared with, at most, each of the N input ports, for the input ports. Moreover, since the calls are unicast, once a match is found, the comparison can stop.

Figure 10:
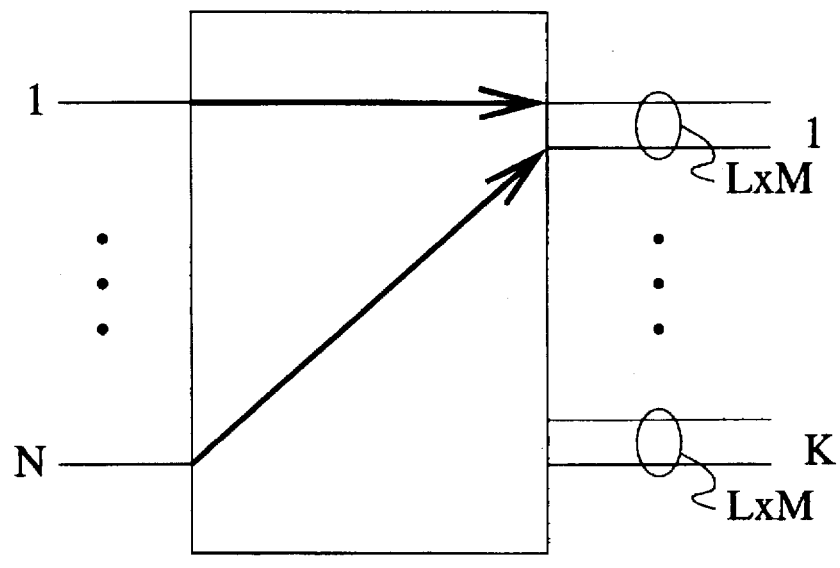
FIGS. 10(a–b) illustrate the complexity of an arbiter for multicast cells.
Figure 10:
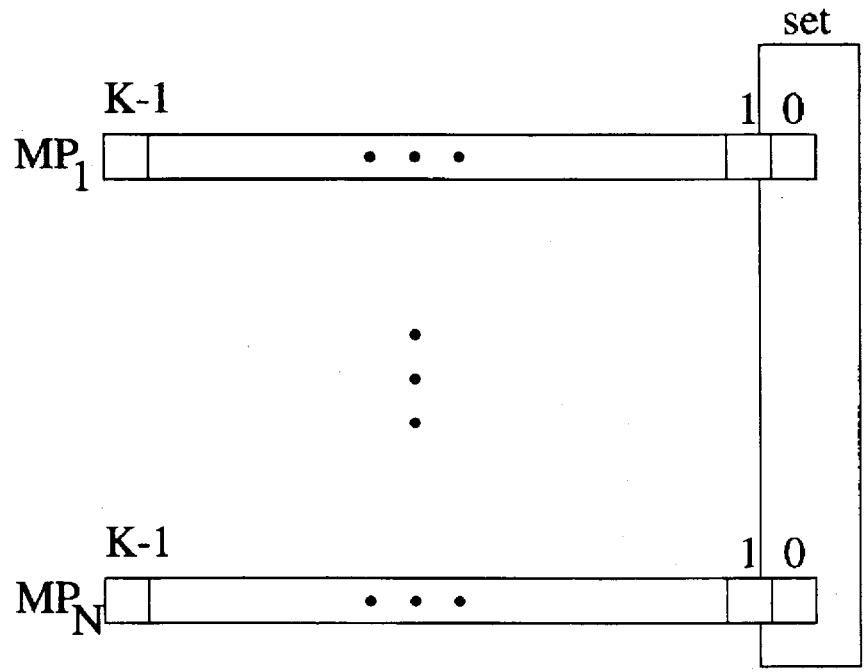

Implementing an arbiter that can handle multicast calls with a call splitting feature and N-to-multiple selection is much more challenging and important. Indeed, an arbiter capable of performing N-to-multiple selection is itself complex as explained below with reference to FIGS. 10a and 10b. As shown in FIG. 10b, at the beginning of each time slot, the arbiter receives N multicast patterns (MPs) 410, one from each input port. Each of the multicast patterns may have K bits, for example. After resolving output contention, the arbiter returns an acknowledgment signal to input ports whose head-head-of-line (HOL) cells have won contention and are allowed to transmit to the switch fabric. As further illustrated in FIG. 10b, among N multicast patterns (MPs) 410 (each with K bits), the multicast bits associated with the same output group are first combined into a set (N bits in each set and K sets in total). As illustrated in FIG. 10a, the arbiter must select up to, for example in our case, L*M bits set to "1" from each set and repeat the selecting operation for K times. All operations must be finished in one cell time slot, which may become a bottleneck for the arbiter when N or K is large.

Our new arbitration algorithm distributively performs the N-to-multiple selection, and does so using the same switch fabric that is used for routing cells. Thus, output port contention is resolved and the cells are advantageously routed simultaneously. Furthermore, contention resolution and call splitting are executed in parallel by all of the input port controllers (IPCs) 101. As a result, the speed limitation usually encountered by other arbitration algorithms for large switch sizes is eliminated. Our arbitration algorithm is much different than others because in our scheme, the head-of-line (HOL) cell is repeatedly sent to the switch fabric to compete with other cells until it has been successfully transmitted to all necessary output groups, i.e., output groups that the cell is destined for.

Unlike other arbitration schemes, our scheme does not wait for an acknowledgment signal before transmitting the cell. When a cell is routed in a switch fabric without waiting for an acknowledgment, two outcomes are possible. The cell can be successfully routed to all necessary output groups, or routed only to a subset of the output groups (including an empty set). The latter outcome is considered a failure, and the head-of-line (HOL) cell will retry in the next time slot. When a cell is transmitted to the switch fabric, since it does not know if it can win output port contention for all necessary output groups, it must be stored in a one-cell buffer for possible retransmission.

The following describes how our arbitration algorithm informs the input port controller (IPC) 101 of the contention status of its head-of-line (HOL) cell, i.e., whether or not the head-of-line HOL cell of the input port controller (IPC) 101 has been successfully transmitted to all necessary output groups. In our arbitration method, the routing modules (RMs) 106 are responsible for returning the routing results to the input port controllers (IPC) 101. The routing modules (RMs) 106 could return the routing results to the input port controllers (IPCs) 101 by having each routing module (RM) 106 inform the input port controllers (IPCs) 101 of the identification (e.g., the broadcast channel number) of cells that have been successfully routed. However, since a cell could be routed to multiple output groups (for instance, up to K output groups for a broadcast situation), one input port controller (IPC) 101 could receive up to K acknowledgments from K routing modules (RMs) 106. Consequently, returning the identification of every successfully routed copy to all input port controllers (IPCs) 101 is too complex to be practical for a large-scale switch. A scheme that significantly simplifies the complexity of the feedback operation (i.e., the reporting of routing results by the routing modules (RMs) 106 to the input port controllers (IPCs) 101 is described below.

The routing module (RM) 106 routes cells to proper output groups as described above with reference to FIGS. 2a through 2c. Moreover, during the routing process, the routing module (RM) 106 chooses up to L*M cells destined for the same output group based on the priority levels of the cells. The head-of-line (HOL) cell of each input port is assigned a priority level different from the others. As discussed above, different fairness schemes can be used to assign priority levels. Due to the architecture of the switch array 201 and switch elements 203, while the cells are routed through a router module (RM) 106, they are simultaneously sorted at the output links of the router module (RM) 106 according to their priority levels, such that when routing through the router module (RM) 106 is complete, the cells will be sorted at the output links of the router module (RM) 106 from left to right in a descending order. Thus, the cell appearing at the rightmost output link has the lowest priority level among the cells that have been routed through this routing module (RM) 106.

This lowest priority information (i.e., the "feedback priority") is broadcast to all of the input port controllers (IPCs) 101. Each input port controller (IPC) 101 will then compare the local priority level (LP) of its head-of-line (HOL) cell with the feedback priority (FP) to determine whether its head-of-line (HOL) cell has been routed through the routing module (RM) 106. If the feedback priority level (FP) is lower than or equal to the local priority level (LP), the input port controller (IPC) 101 knows that its head-of-line (HOL) cell has reached one of the output links of the routing module (RM) 106. Otherwise, the head-of-line (HOL) cell of the input port controller (IPC) 101 must have been discarded in the routing module (RM) 106 due to loss of contention. Such discarded head-of-line (HOL) cells will be retransmitted in the next time slot. Since there are K routing modules (RMs) 106, there will be K lines broadcast from the K routing modules to all of the input port controllers (IPCs) 101, each of the K lines carrying the lowest priority information in its output group.

As discussed above, four arbitration policies have been proposed to achieve fairness among the input ports: random, round-robin, state-dependent, and delay-dependent (See, e.g., Handel et al., *ATM Networks: Concepts, Protocols, Applications*, Chapter 7, Addison-Wesley (1994)). The random scheme randomly chooses the head-of-line (HOL) cells of input ports for transmission. Unfortunately, the random scheme has a large delay variation. The round-robin scheme chooses head-of-line (HOL) cells from input ports in a round-robin fashion by dynamically changing the scanning point from the top input port to the bottom input port. We expect that this scheme will perform well even with heterogeneous (or correlated) traffic. The state-dependent scheme chooses the head-of-line (HOL) cell in the longest input queue such that input queue lengths are maintained nearly equal, achieving the input buffers sharing effect. The delay-dependent scheme performs like a global FIFO (first in, first out) queue, in which the oldest head-of-line (HOL) cell to be transmitted to the output has the highest priority.

Since our arbitration is performed in a distributed manner by K routing modules (RMs) 106 and in parallel by input port controllers 101, any of the above schemes, or a combination of them, can be implemented by arbitrarily assigning a priority level to the head-of-line (HOL) cell. For instance, the random scheme can be implemented by assigning a random number ranging from 1 to N to the priority level of a cell. The round-robin scheme can be implemented by initially assigning the cell priority with the input port address and by then decrementing the cell priority in every cell slot. (See, e.g., S down counter 716 of FIG. 7. The state-dependent scheme can be implemented by assigning the cell priority based on the queue length or the available input buffer size. Therefore, cells with a smaller available buffer size have a higher priority. The delay-dependent scheme can be implemented by time-stamping each arriving cell such that cells with a smaller time stamp (arriving earlier) will have a higher priority (i.e., will be transmitted earlier).

At the beginning of a time slot (about 2.8 microseconds =(53 bytes * 8 bits/byte) 155.52 Mbit/second), each input port controller (IPC) 101 sends its head-of-line (HOL) cell to the multicast grouping network (MGN) 102. In each input port controller (IPC) 101, the head-of-line (HOL) cell is also temporarily stored in a one-cell sized buffer during its transmission. After cells have traversed through the switch element arrays (SWEs) 203 of the routing modules (RMs) 106, feedback priority information, $FP_1$ to $FP_K$ (the priority of the right (east) most output link of K RMs), is fed back to every input port controller (IPC) 101. Each input port controller (IPC) 101 then compares the feedback priority levels $FP_j$, j=1,2, . . . K, against its local priority level, LP (see step 510 of FIG. 5). Three comparison results are possible. First, the j-th bit of the multicast pattern (MP) 410 of the head-of-line (HOL) cell can be equal to "0", ($MP_j$=0), which means the head-of-line (HOL) cell is not destined for j-th output group. In this instance, the $MP_j$ bit remains "0" and the next bit ((j+1)th bit) of the multicast pattern is analyzed (See steps 508 and 509 of FIG. 5). Second, the j-th bit of the multicast pattern (MP) 410 of the head-of-line (HOL) cell can be "1" ($MP_j$=1) and the local priority level can be less than or equal to the j-th feedback priority level (i.e., LP≦$FP_j$) (recall that the smaller the priority value, the higher the priority level). This second possibility indicates that the head-of-line (HOL) cell is destined for the j-th output group and has been successfully routed through the j-th routing module (RM) 106. The $MP_j$ bit is then set to "0" and the next bit ((j+1)th bit) of the multicast pattern is analyzed (see steps 510, 512, and 509 of FIG. 5). Third, the j-th bit of the multicast pattern of the head-of-line (HOL) cell can be "1" ($MP_j$=1) and the local priority level can be greater than the j-th feedback priority (i.e., LP>$FP_j$). This third possibility indicates that head-of-line (HOL) cell is destined for the j-th output group but was discarded in the j-th routing module. The $MP_j$ bit remains "1" and a resend bit is set to "1" so that the buffer cell can be retransmitted (see steps 510 and 511 of FIG. 5).

After all $MP_j$ bits (j=1,2, . . . , K) have been updated according to one of the above three scenarios (see step 503 of FIG. 5), a signal indicating whether the head-of-line (HOL) cell should be retransmitted, will be asserted to "1" if any one of $MP_j$ bits in the multicast pattern (MP) 410 is set to "1" The resend signal is initially set to "0". (See FIG. 5; boxes 501 and 502.) If all $MP_j$ bits are "0", indicating the head-of-line (HOL) cell has been successfully transmitted to all necessary output groups, the resend signal will not be asserted, i.e., the resend signal will remain set to "0" The input port controller (IPC) 106 will then clear the head-of-line (HOL) cell in the one-cell buffer and transmit the next cell in the input buffer in the next time slot (if any). (See FIG. 5, boxes 506 and 507.) Otherwise, the head-of-line (HOL) cell is retransmitted with a modified multicast pattern (MP). (See FIG. 5, boxes 504, 505 and 506.) FIG. 5 summarizes the comparison of the local priority (LP) with K feedback priorities (FPs).

Figure 6:
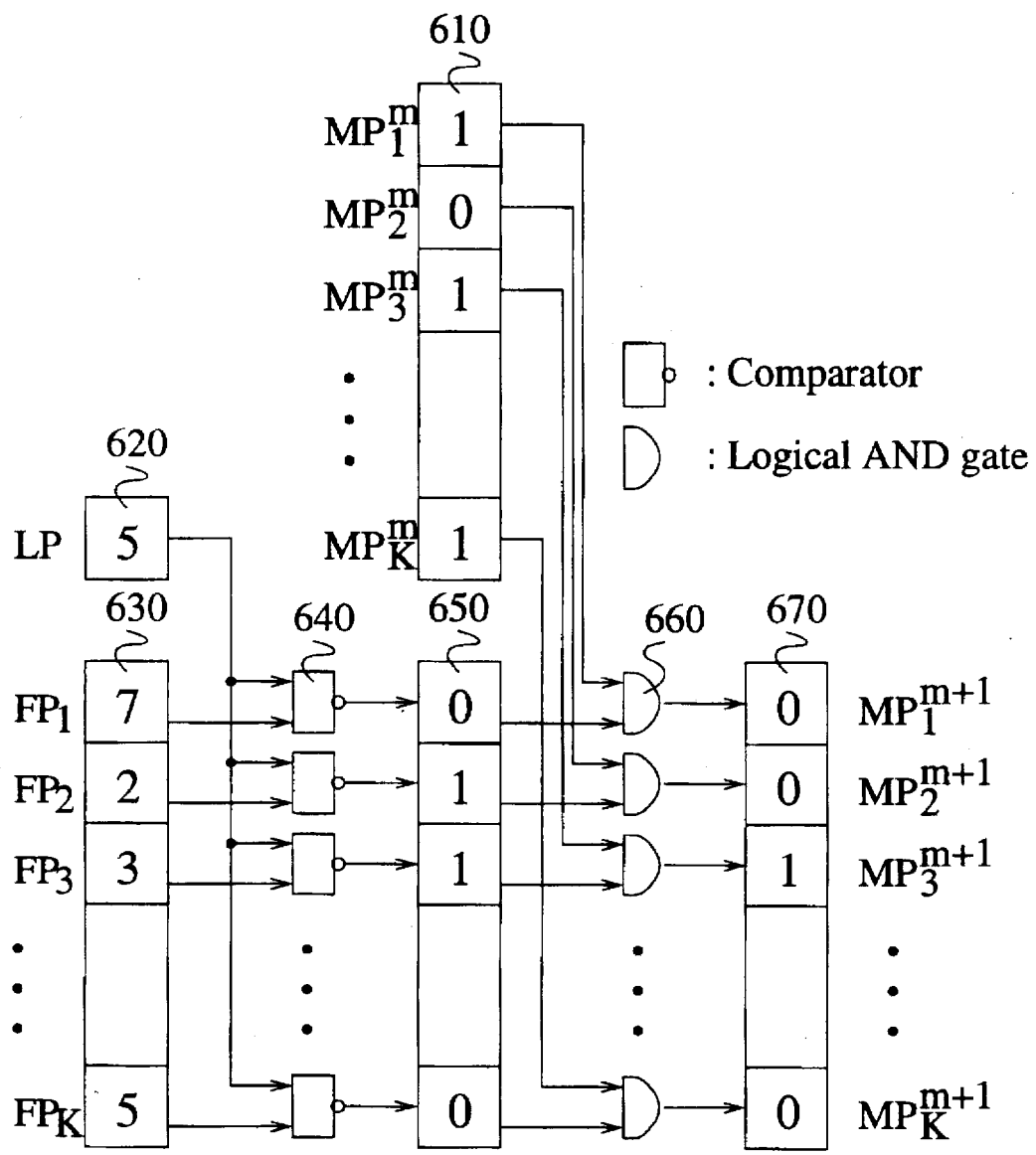
FIG. 6 is a block diagram which illustrates how a multicast pattern is modified by our new ATM switch.

FIG. 6 is a block schematic which illustrates an example of modifying a multicast pattern MP. Assume that at the beginning of the m-th time slot, the head-of-line (HOL) cell is destined for three output groups: group no. 1, group no. 3 and group no. K. Therefore, the multicast pattern 610 at the m-th time slot, $MP^m$, is equal to "1010 . . . 01". Also assume that the local priority value (LP) 620 of the head-of-line (HOL) cell is 5, i.e., LP=5, and the feedback priority values (FPs) 630 from 1, 2, 3, and K, are 7, 2, 3, and 5, respectively. The result 650 of comparing the local priority LP (5) with the K feedback priority values (FPs) is "011X . . . X0" (where "X" can be either a "0" or a "1"). The comparison result 650 is then logically ANDed 660 with the multicast pattern 610 of the m-th time slot $MP^m$. The result 670 of the AND operation produces a new multicast pattern, "0010 . . . 00", at the next time slot, $MP^{m+1}$. In this example, the head-of-line (HOL) cell has been routed successfully in the first routing module ($RM_1$) and the K-th routing module ($RM_K$). However, the head-of-line (HOL) cell was discarded in the third routing module ($RM_3$) and must be retransmitted with the new multicast pattern $MP^{m+1}$ that has its third bit set to "1".

The implementation of input port controller 101 is explained with reference to FIG. 7 which is a block diagram of the input port controller (IPC) 101. In this example, the ATM switch has 256 input ports and 256 output ports and every 16 output ports are in one group, i.e. M=16. Our input port controller (IPC) 101 differs from conventional input port controllers at least because it includes a multicast contention resolution unit (MCRU) 710, shown in a dashed box. The multicast contention resolution unit (MCRU) 710 determines whether or not the head-of-line (HOL) cell has been successfully routed to all necessary output groups by comparing the K feedback priorities ($FP_{1-FP_K}$) 711 (see also, element 630 of FIG. 6) from the K routing modules (RMs) 106 with the local priority (LP) 712 (see also, element 620 of FIG. 6) of the head-of-line (HOL) cell. This comparison is performed by comparators 713 (see also, elements 640 of FIG. 6).

The input line from the SONET (Synchronous Optical Network)ATM network is terminated at terminal 720. To decrease the rate from 155.52 Mbit/second, 16-bit cells are written into an input buffer 730 from terminal 720. The virtual channel identification and virtual path identification (VCI/VPI) of the head-of-line (HOL) cell are used to extract necessary information from a translation table 740, which may be implemented with a content addressable memory (CAM). This information includes a broadcast channel number (BCN) 440, which uniquely identifies each multicast call in the entire switch, and multicast pattern (MP) 410 for the multicast grouping network (MGN) 102. This information is then combined with a priority field (P) to form the routing information 400, as shown in FIG. 4.

As the ATM cell is transmitted to the multicast grouping network (MGN) 102 through a parallel-to-serial converter (PS) 750, the ATM cell is also temporarily stored in a one-cell buffer 714. If the cell is not successfully routed through the routing modules (RMs) 106, it will be retransmitted in the next cell cycle. During retransmission, the ATM cell is written back to the one cell buffer 714 in case it fails to route through with the input address and decremented by one at each cell clock. The R down counter 715 is initially set to all "1s" and is decreased every time the head-of-line (HOL) cell is not successfully routed through all required routing modules (RMs) 106. When the R-counter 715 reaches zero, it will remain at zero until the head-of-line (HOL) cell has been cleared and a new (the next) ATM cell becomes the head-of-line (HOL) cell.

K feedback priority signals, $FP_1$ to $FP_K$, are converted to 16-bit wide signals by the serial-to-parallel converters (SP) 717 and are latched at the 16-bit registers 711. The contents of each of the registers 711 are simultaneously compared with the local priority (LP) of the head-of-line (HOL) cell stored in register 712, by K comparators 713. Recall that the larger the priority value is, the lower the priority level is. If the value of the feedback priority of the j-th routing module (RM) 106 $FP_j$ is larger than or equal to the local priority value (LP) stored in register 712, the output of the j-th comparator 713 is asserted low, which will then reset the $MP_j$ bit to zero regardless of what its value was ("0" or "1") since the output of each of the comparators 713 is ANDed at AND gates 718 with a corresponding bit of the multicast pattern (MP) 410 of the head-of-line (HOL) cell stored in register 719. The result of the logical ANDs are stored in the register 719.

After the resetting operation, if any one of the bits of the updated multicast pattern (MP) is still "1", indicating that at least one head-of-line (HOL) cell was not successfully routed through the routing module (RM) 106 (i.e., lost contention) in the current cycle, the "resend" signal will be asserted high. This is accomplished by ORing each of the bits of the multicast pattern MP at OR gate 760. The "resend" signal is applied to the first bit of the buffer 714. If the "resend" signal is high, the head-of-line (HOL) cell stored in buffer 714 will be retransmitted in the next cell cycle according to the modified multicast pattern (MP).

Figure 7:
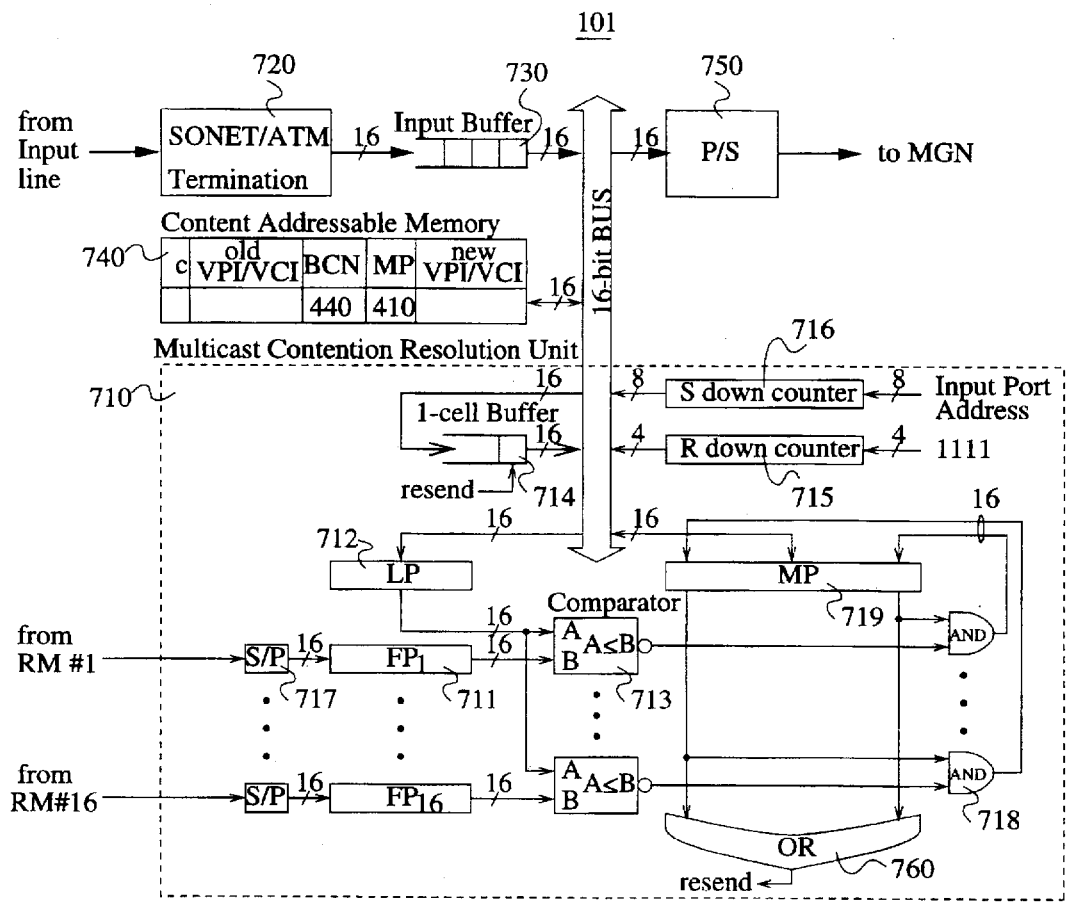
FIG. 7 is a block diagram which illustrates an input port controller which may be used with the ATM switch of FIG. 1.

As shown in FIG. 7, there are K sets of serial to parallel converters SP (717), feedback priority FP registers 711, and comparators 713. As the size of the ATM switch increases, the number of output groups, K, also increases. To reduce hardware complexity, only one set of this hardware is required if the comparison of the local priority value (LP) stored in register 712 with K feedback priority (FP) values stored in registers 711 is time division multiplexed.

A large-scale ATM switch can be formed by cascading a number of the smaller ATM switches shown in FIG. 1. Our ATM switch has employed several techniques to accommodate a large-scale size (e.g., 1,024 * 1,024). For instance, a cross-bar structure of the switch element SWE) array 201 permits short interconnections between switch elements (SWEs) 203. By using input and output buffering, lower speed memory chips can be used at the input and output ports. Using distributed and parallel processing to implement the multicast contention resolution eliminates the bottleneck of N-to-multiple arbitration. However, the timing required to route cells and resolve contention also needs to be considered when building a large-scale ATM switch.

To temporally align the signals of the vertical routing links and the horizontal lines in the routing modules (RM) 106, incoming cells from the input port controllers (IPCs) 101 and dummy cells from the address broadcasters (ABs) 202 are appropriately skewed (delayed in delay buffers) before they are sent to the switch element (SWE) array 201. (See e.g., U.S. Pat. No. 5,179,522, and particularly FIG. 14, expressly incorporated herein by reference.) Specifically, to implement the proposed multicast contention resolution algorithm, the time it takes to route cells through a routing module (RM) 106 and to feed back the lowest priority information from the routing modules (RM) 106 to all input port controllers (IPCs) 101 must be less than one cell slot time (i.e., 2.8 microseconds=(53 bytes * 8 bits/byte) /155.52 Mbits/second). If the time is greater than one cell slot time, two outcomes are possible. First, if a cell is held in the one-cell buffer 714 longer than a cell slot time, the throughput of the switch fabric will be degraded. Second, if a cell next to the head-of-line (HOL) cell ("the next cell") is permitted to be transmitted into the multicast grouping network (MGN) 102, "the next cell" may arrive at the output port ahead of the head-of-line (HOL) cell if the head-of-line (HOL) cell did not initially pass through the multicast grouping network (MGN) 102, but passed through the multicast grouping network (MGN) 102 when it (the head of line (HOL) cell) was retried in the next time slot(s). Although this out-of-sequence problem can be resolved with a resequencing circuit at the output port, in a large scale ATM switch, such a resequencing circuit may be too complex to be practical.

Since each switch element (SWE) 203 in a routing module (RM) 106 introduces a 1-bit delay as the signal passes it in either direction (cross or toggle), the maximum number of switch elements (SWEs) 203 between the input port controller (IPC) 101 at the upper left most (i.e., northwest most) input and the lower rightmost corner (i.e., southeast most) of the routing module (RM) 106 should be less than the number of bits in an ATM cell. In other words, (N+L×M−1)+(N/M+log$_2$N+7) should be less than the cell length in bits, where (N+L×M−1) represents a delay in a routing module (RM), NM represents a delay due to the 2 byte multicast pattern (MP), log$_2$N represents a delay due to the input port priority bits (S), and 7 is chosen based on a portion of the priority field; namely the activity bit (A), the call priority bit (C), the buffer state priority bit (Q), and the retry priority bits (R) as shown in FIG. 4. For example, if M=16, L=1.25, and the cell size is 64 bytes within the switch fabric, (N+16×1.25−1)+(N/16+log$_2$N+7) ≦512. Thus, in this case, the maximum value of N is 448, which may not be large enough for a large-scale switch node.

Figure 8:
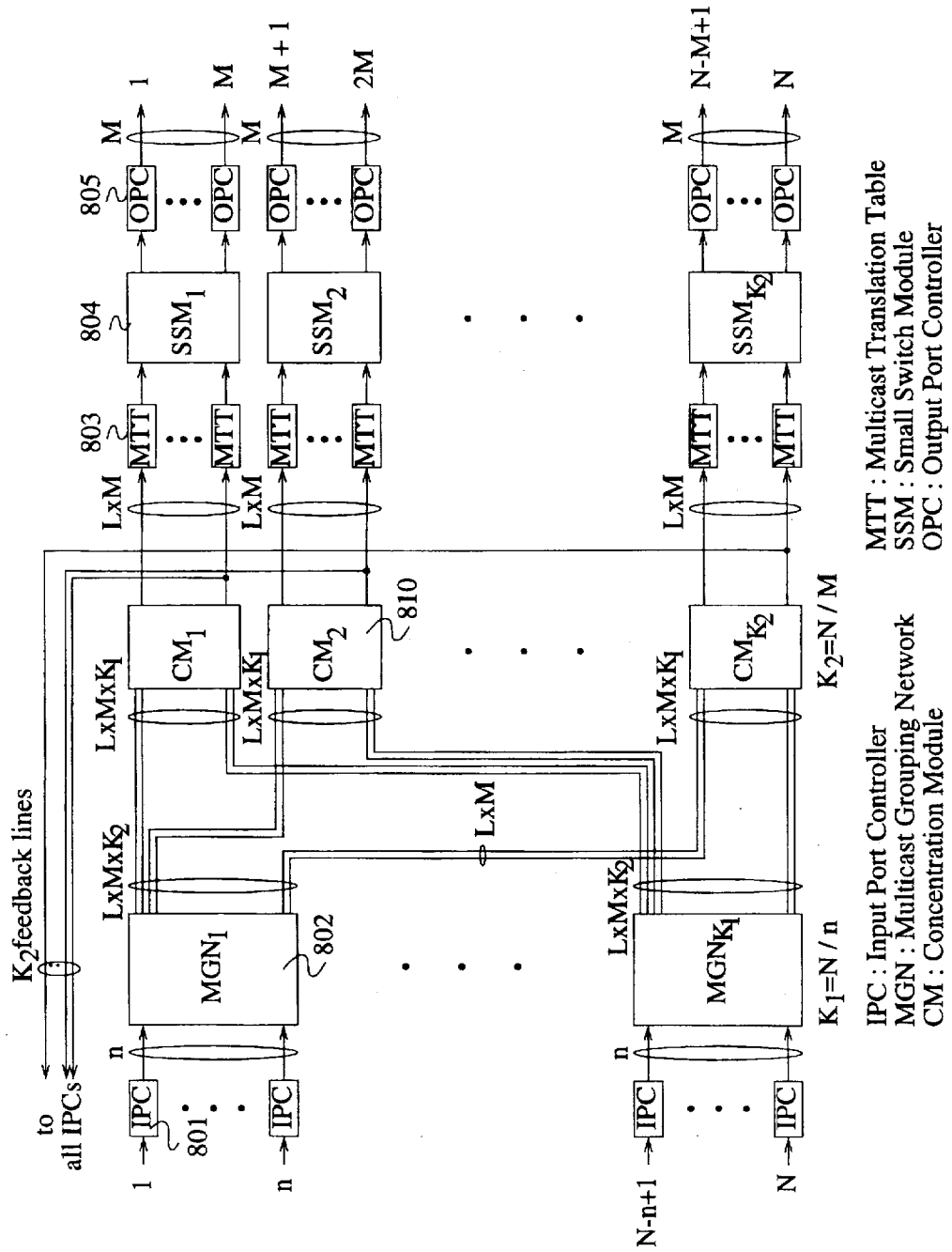
FIG. 8 is a block diagram which illustrates how the ATM switch of FIG. 1 can be scaled to create a large-scale ATM switch.

The cascaded large-scale ATM switch illustrated in FIG. 8 overcomes the above mentioned constraints. To reduce the time spent to traverse cells through the switch element (SWE) array 201 of the routing module (RM) 106 and feeding back the lowest priority information (FP) to the input port controllers (IPCs) 101, the number of switch elements (SWEs) 203 in the routing module (RM) 106 cannot be too large. For instance, if we partition N inputs into $K_1$ groups, each of the $K_1$ groups having n inputs (i.e., $N=n * K_1$), the size of the multicast grouping network (MGN) 102 is reduced from N to n. In other words, one big multicast grouping network (MGN) (see 102 of FIG. 1) is divided into $K_1$ smaller multicast grouping networks (MGNs) 802 each having n input lines, as shown in FIG. 8. Recall that in our ATM switch illustrated in FIG. 1, each output group of M output ports 105 requires L*M routing links to achieve an acceptable throughput. The large scale ATM switch of FIG. 8 has multicast grouping networks $K_1$ (MGNs) 802, each having L*M routing links for each output group. Therefore, $K_1*(L*M)$ lines must be further concentrated to L*M outputs by using NM ($=K_2$) concentration modules (CMs) 810 at a stage following the multicast grouping networks 802 and preceding the output groups. Although the structure and implementation of the concentration modules (CMs) 810 and the routing modules (RMs) 106 is identical, the function performed by each is a little different. Since the cells passing through the routing modules (RMs) 106 to the concentration module (CM) 810 always have correct output group addresses, the concentration modules 810 only need to perform concentration but do not need to perform a routing function.

Note that the feedback lines carrying the lowest priority (i.e., the feedback priorities FP) are returned from the output links of the second stage concentration modules (CMs) 810, instead of from the outputs of the first stage routing modules (RM) 106. Since there are $K_2$ (=N/M) output ports, $K_2$ feedback lines are needed. The maximum delay between the input port controller (IPC) 101 and the last routing link of the second stage concentration modules (CMs) 810 is n (which accounts for the "vertical" delay of the switch elements of the multicast grouping network (MGM) 802)+ K1 (L*M) (which accounts for the "vertical" delay of the switch elements of the concentration module (CM) 810)+ (L*M)−1 which accounts for the "horizontal" delay of the switch elements of the concentration module (CM) 810),+ N/M+$\log_2$N+7, (where N/M accounts for the delay due to the multicast pattern (MP), $\log_2$N accounts for the delay due to the input port priority bits (S), and 7 accounts for a delay due to the activity bit (A), the call priority bit (C), the buffer state priority bit (Q), and the retry priority bits (R)) which should be less than 512 bits. For example, if we choose M=16, L=1.25, and n=256, the maximum number of inputs that can be supported is 1,557. As shown, the cascaded large-scale ATM switch may also include multicast translation tables 803, small switch modules 804, and output port controllers 805, arranged as shown in FIG. 8.

Figure 9:
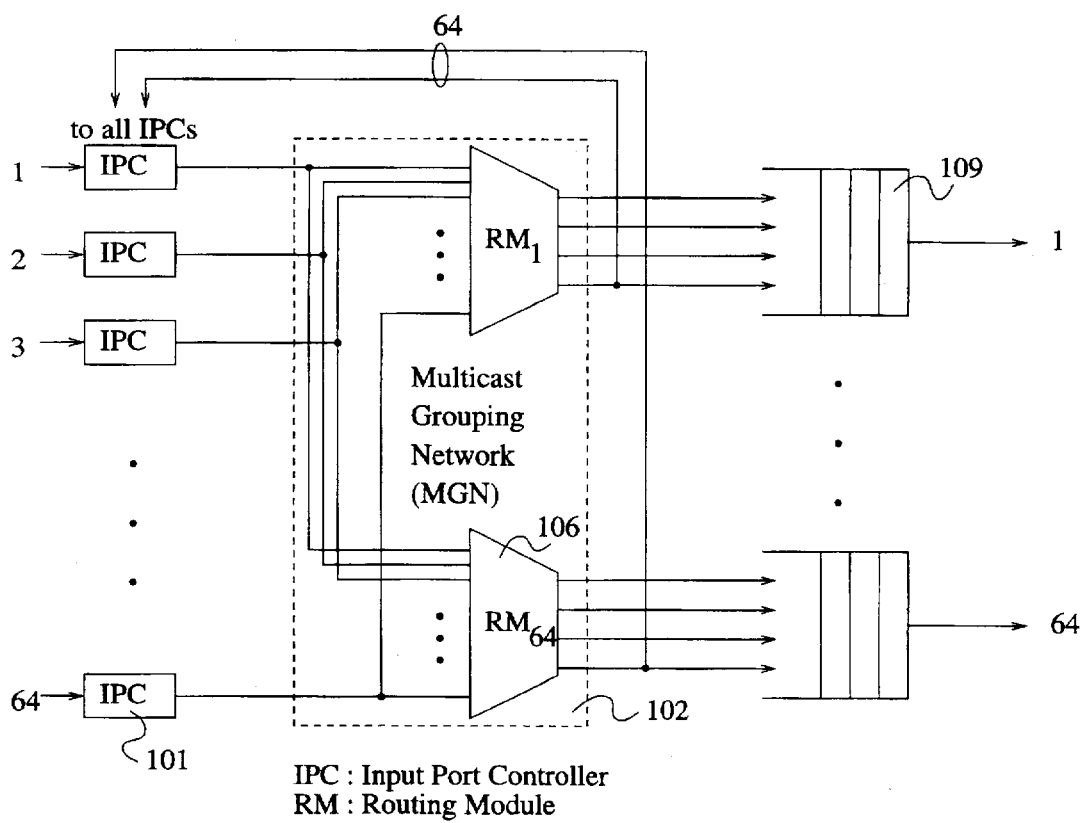
FIG. 9 is a block diagram which illustrates the architecture of our smaller-scale ATM switch.

FIG. 9 is a block diagram which illustrates the architecture of a smaller scale (e.g., 64×64) ATM switch in accordance with the present invention. With this architecture using input and output buffers, the required memory speed can be easily achieved with commercially available memory chips that have been commonly used in personal computer markets for example. Simulations have shown that to achieve a system throughput of about 99%, L (the expansion ratio) is at least 4. Since the output ports need not be grouped, M is one. Thus, each of the N (e.g., 64) routing modules (RMs) 106 are coupled with the N input port controllers (IPCs) 101 and provide L×M (i.e., 4) outputs. Each routing module (RM) 106 also provides a feed back priority value to each of the input port controllers (IPCs) 106. Each of N (e.g., 64) output buffers 109 can accept up to 4 cells (for L=4) in each time slot.

When cells arrive at an input port controller (IPC) 106, the input port controller (IPC) 106 attaches routing information the header of each cell. Cells are then routed by a multicast grouping network (MGN) 102 to the proper output port(s) based on the routing information attached by the input port controller (IPC) 101. Thus, by using our novel arbitration algorithm combined with feedback information from each of the routing modules (RMs), output port contention can be easily resolved. Each output port transmits a cell in every time slot if the output buffer is not empty.

Thus, our new ATM switch can be used in a new architecture to implement a scaleable multicast ATM switch with input and output buffers. Our ATM switch includes a non-blocking memoryless switch fabric followed by small switch modules at the output ports. Our ATM switch employs a novel algorithm to resolve the contention of multicast cells destined to the same output port (group). Our ATM switch also provides the capability of sharing input buffers, achieving fairness among the input ports, and performing the multicast call splitting function. The channel grouping concept adopted in our ATM switch reduces its hardware complexity and improves its throughput.

Cell replication, cell routing, output contention resolution, and cell addressing are all performed distributively in our ATM switch. Consequently, our ATM switch can be scaled up to a large-scale ATM switch having thousands of input and output ports. Cell replication is achieved by broadcasting incoming cells to multiple switch modules, which consist of a two-dimensional array of switch elements (SWEs). The regular structure permits the switch element array to be implemented on a high-density VLSI chip, for instance 32×32 switch elements (SWEs), and to have relaxed synchronization for data and clock signals. Our entire switch can be implemented by a traditional economic CMOS technology.

What is claimed is:

1. A switch for routing cells from a plurality of input ports to a plurality of output ports, the switch comprising:
   a) a plurality of input port controllers, each of the plurality of input port controllers
      i) having a cell input for receiving cells from an associated one of the plurality of input ports,
      ii) having a plurality of feedback inputs,
      iii) having a cell output,
      iv) terminating a line of the associated one of the plurality of input ports,
      v) buffering a cell received at the associated one of the plurality of input ports,
      vi) storing a local priority value based on information included in the cell received at the associated one of the plurality of input ports,
      vii) storing a multicast pattern based on information included in the cell received at the associated one of the plurality of input ports,
      viii) comparing each of a plurality of feedback priority values, provided at the plurality of feedback inputs, with the stored local priority value to form a set of comparison results,
      ix) updating the multicast pattern based on the set of comparison results, and
      x) applying one of a next cell received at the associated one of the plurality of input ports and the cell buffered, to the cell output based on the updated multicast pattern; and b) a plurality of routing modules for routing cells to one of a plurality of output groups, each of the plurality of routing modules
   i) having a plurality of inputs, each of the plurality of inputs coupled with the cell output of a corresponding one of the plurality of input port controllers,
   ii) having an address generator for generating addresses corresponding to a group of associated output ports,
   iii) having an array of switch elements, each of the switch elements having a first input, a second input, a first output and a second output, wherein the array of switch elements includes an first row of switch elements, a last row of switch elements, a first column of switch elements, a last column switch elements, and an internal array of switch elements not belonging to any one of the first row, the last row, the first column, and the last column, each of the switch elements of the first row having its second input provided with one of the addresses generated by the address generator and having its second output coupled with the second input of a corresponding switch element in an adjacent row, each of the switch elements of the first column having its first input coupled with the cell output of an associated input port controller and having its first output coupled with the first input of a corresponding switch element in an adjacent column, each of the switch elements of the last row having its second output coupled with an associated one of the outputs of the routing module and having its second input coupled with the second output of an associated switch element in an adjacent row, each of the switch elements of the last column having its first input coupled with the first output of an associated switch element in an adjacent column, the second output of the switch element belonging to both the last row and the last column providing a feedback priority value which is applied to an associated one of the plurality of feedback inputs in each of the input port controllers, each of the switch elements belonging to the internal array having
      its first input coupled with the first output of an adjacent switch element of a preceding column, and
      its second input coupled with the second output of an adjacent switch element of a preceding row, wherein each of the switch elements have a toggle state in which its first input is coupled with its second output and its second input is coupled with its first output, and a cross state in which its first input is coupled with its first output and its second input is coupled with its second output, and wherein each of the switch elements assume the toggle state when address information of a cell applied at its first input matches address information applied to its second input and priority information of the cell applied at its first input is higher than priority information applied at its second input, and otherwise assumes the cross state.

2. The switch of claim 1 further comprising a plurality of output buffers, each of the plurality of output buffers coupled with the outputs of an associated one of the plurality of routing modules.

3. The switch of claim 1 further comprising:
c) a plurality of translation devices, each of the plurality of translation devices
   i) having an input coupled with an associated output of an associated one of the plurality of routing modules,
   ii) for updating routing information thereby providing updated routing information, and
   iii) having an output provided with the updated routing information;

d) a plurality of small switch modules, each of the plurality of small switch modules having a plurality of inputs, each of the plurality of inputs coupled with the output of a corresponding translation device associated with a corresponding one of the plurality of routing modules, for routing data applied to any of its plurality of inputs to one of a plurality of outputs; and e) a plurality of output port controllers, each of the plurality of output port controllers having an input coupled with a corresponding one of the plurality of outputs of an associated one of the plurality of small switch modules.

4. The switch of claim 3 wherein the plurality of input port controllers consists of N input port controllers, the plurality of routing modules consists of K routing modules, the plurality of outputs of each of the K routing modules consists of L times M outputs, the plurality of translation devices consists of K times L times M translation devices, the plurality of small switch modules consists of K small switch modules, and the plurality of output port controllers consists of N output port controllers.

5. The switch of claim 4 wherein K equals N divided by M.

6. The switch of claim 4 wherein L is a function of M and a required minimum throughput value.

7. The switch of claim 1 wherein a temporal delay caused by the routing module is less than one cell time.

8. The switch of claim 7 wherein one cell time is defined as the number of bits of a cell divided by a transmission rate of a network of which the switch is a part.

9. The switch of claim 1 wherein each of the routing modules provides output port contention resolution.

10. A switch for routing cells from a plurality of input ports to a plurality of output ports, the switch comprising:
a) a plurality of input port controllers, each of the plurality of input port controllers
   i) having a cell input for receiving cells from an associated one of the plurality of input ports,
   ii) having a plurality of feedback inputs,
   iii) having a cell output,
   iv) terminating a line of the associated one of the plurality of input ports,
   v) buffering a cell received at the associated one of the plurality of input ports,
   vi) storing a local priority value based on information included in the cell received at the associated one of the plurality of input ports,
   vii) storing a multicast pattern based on information included in the cell received at the associated one of the plurality of input ports,
   viii) comparing each of a plurality of feedback priority values, provided at the plurality of feedback inputs, with the stored local priority value to form a set of comparison results,
   ix) updating the multicast pattern based on the set of comparison results, and
   x) applying a next one of cells received at the associated one of the plurality of input ports and the cell buffered, to the cell output based on the updated multicast pattern;

b) a plurality of multicast grouping networks, each of the plurality of multicast grouping networks including a plurality of inputs coupled with the cell output of a corresponding one of the plurality of input port controllers, a plurality of outputs, and a plurality of routing modules for routing cells to one of a plurality of outputs, each of the plurality of routing modules
  i) having a plurality of inputs, each of the plurality of inputs coupled with a corresponding one of the plurality of inputs of an associated one of the plurality of multicast grouping networks,
  ii) having an address generator for generating addresses corresponding to a group of associated output ports,
  iii) having an array of switch elements, each of the switch elements having a first input, a second input, a first output and a second output,
wherein the array of switch elements includes an first row of switch elements, a last row of switch elements, a first column of switch elements, a last column switch elements, and an internal array of switch elements not belonging to any one of the first row, the last row, the first column, and the last column,
  each of the switch elements of the first row having its second input provided with one of the addresses generated by the address generator and having its second output coupled with the second input of a corresponding switch element in an adjacent row,
  each of the switch elements of the first column having its first input coupled with the cell output of an associated input port controller and having its first output coupled with the first input of a corresponding switch element in an adjacent column,
  each of the switch elements of the last row having its second output coupled, via an associated one of the outputs of the routing module, with an associated one of the plurality of outputs of the associated one of the plurality of multicast grouping networks, and having its second input coupled with the second output of an associated switch element in an adjacent row,
  each of the switch elements of the last column having its first input coupled with the first output of an associated switch element in an adjacent column,
  each of the switch elements belonging to the internal array having
    its first input coupled with the first output of an adjacent switch element of a preceding column, and
    its second input coupled with the second output of an adjacent switch element of a preceding row,
wherein each of the switch elements have a toggle state in which its first input is coupled with its second output and its second input is coupled with its first output, and have a cross state in which its first input is coupled with its first output and its second input is coupled with its second output, and wherein each of the switch elements assume the toggle state when address information of a cell applied at its first input matches address information applied to its second input and priority information of the cell applied at its first input is higher than priority information applied at its second input, and otherwise assumes the cross state; and
  c) a plurality of concentration modules each of the plurality of concentration modules
    i) including a plurality of inputs coupled with associated ones of the outputs of each of the multicast grouping networks,
    ii) having an array of switch elements, each of the switch elements having a first input, a second input, a first output and a second output,
wherein the array of switch elements includes an first row of switch elements, a last row of switch elements, a first column of switch elements, a last column switch elements, and an internal array of switch elements not belonging to any one of the first row, the last row, the first column, and the last column,
  each of the switch elements of the first row having its second output coupled with the second input of a corresponding switch element in an adjacent row,
  each of the switch elements of the first column having its first input coupled with an associated one of the plurality of inputs of that concentration module and having its first output coupled with the first input of a corresponding switch element in an adjacent column,
  each of the switch elements of the last row having its second output coupled with an associated one of the plurality of outputs of the concentration module, and having its second input coupled with the second output of an associated switch element in an adjacent row,
  each of the switch elements of the last column having its first input coupled with the first output of an associated switch element in an adjacent column,
  the second output of a switch element in both the last row and last column applying a feedback priority signal to an associated one of the plurality of feedback inputs in each of the plurality of input port controllers,
  each of the switch elements belonging to the internal array having
    its first input coupled with the first output of an adjacent switch element of a preceding column, and
    its second input coupled with the second output of an adjacent switch element of a preceding row,
wherein each of the switch elements have a toggle state in which its first input is coupled with its second output and its second input is coupled with its first output, and have a cross state in which its first input is coupled with its first output and its second input is coupled with its second output, and wherein each of the switch elements assume the toggle state when priority information of the cell applied at its first input is higher than priority information applied at its second input, and otherwise assumes the cross state.

11. The switch of claim 10 further comprising:
  c) a plurality of translation devices, each of the plurality of translation devices
    i) having an input coupled with an associated output of an associated one of the plurality of concentration modules,
    ii) for updating routing information thereby providing updated routing information, and
    iii) having an output provided with the updated routing information;
  d) a plurality of small switch modules, each of the plurality of small switch modules having a plurality of inputs, each of the plurality of inputs coupled with the output of a corresponding translation device associated with a corresponding one of the plurality of routing modules, for routing data applied to any of its plurality of inputs to one of a plurality of outputs; and
  e) a plurality of output port controllers, each of the plurality of output port controllers having an input coupled with a corresponding one of the plurality of outputs of an associated one of the plurality of small switch modules.

12. The switch of claim 11 wherein the plurality of input port controllers consists of N input port controllers, the plurality of multicast grouping networks consists of K1 multicast grouping networks, the plurality of outputs of each of the K1 multicast grouping networks consists of L times M times K2 outputs, the plurality of concentration modules consisting of K2 concentration modules, the plurality of translation devices consists of K2 times L times M translation devices, the plurality of small switch modules consists of K2 small switch modules, and the plurality of output port controllers consists of N output port controllers.

13. The switch of claim 12 wherein K2 equals N divided by M.

14. The switch of claim 12 wherein L is a function of M and a required minimum throughput value.

15. In a multicast switch having a plurality of input port controllers for receiving cells, the cells having an associated priority value and a multicast bit pattern, for buffering a head-of-line cell, and for transmitting the cells, and a plurality of routing modules for routing incoming cells, transmitted from each of the plurality of input port controllers, to an associated one of K groups of output ports and for providing a feedback priority value based on a priority value associated with a lowest priority cell passed to the associated group of output ports, a method for resolving output port contention comprising steps of:

a) setting an output group index to one and setting a resend bit to a low state;

b) determining whether the output group index is less than or equal to the total number K of output groups;

c) if the output group index is determined to be less than or equal to the total number of output groups in step b), performing sub-steps of i) determining whether a bit of the multicast pattern of the head-of-line cell, associated with the output group index, is set to a high state, ii) if the bit of the multicast pattern of the head-of-line cell, associated with the output group index, is not set to the high state
    incrementing the output group index by one, and repeating step (b);

iii) if the bit of the multicast pattern of the head-of-line cell, associated with the output group index, is set to the high state,
    determining whether a the priority value of the head-of-line cell is less than or equal to the feedback priority value from a routing module associated with the output group index,
    if the priority value of the head-of-line cell is less than or equal to the feedback priority value from the routing module associated with the output group index,
      setting the bit of the multicast pattern of the head-of-line cell, associated with the output group index, to the low state,
      incrementing the output group index by one, and repeating step (b),
    if the priority value of the head-of-line cell is not less than or equal to the feedback priority value from the routing module associated with the output group index,
      setting the resend bit to the high state,
      incrementing the output group index by one, and repeating step (b); and d) if the output group index was not determined to be less than or equal to the total number K of output groups in step (b), i) determining whether the resend bit is set to the high state or the low state, ii) if the resend bit is determined to be set to the high state in step (d)(i), retransmitting the head-of-line cell with the multicast pattern, and iii) if the resend bit is determined to be set to the low state in step (d)(i), clearing the head-of-line cell from the buffer, and transmitting and buffering a next in line cell.

16. A multicast switch for routing incoming cells, each of the cells having a multicast bit pattern and a priority value, arriving at a plurality of input ports, to one of a plurality of output ports, the multicast switch comprising:

a) a plurality of routing modules, each of the plurality of routing modules for routing received cells to an associated one of a plurality of groups of output ports and for providing a feedback priority value based on a priority value associated with a lowest priority cell passed to the associated one of the plurality of groups of output ports; and b) a plurality of input port controllers, each of the plurality of input port controllers for receiving the incoming cells, for buffering a head-of-line cell, for transmitting the head-of-line cell to each of the plurality of routing modules, for storing the multicast bit pattern, for comparing the priority value of the buffered head-of-line cell with the feedback priority values from each of the plurality of routing modules to form a plurality of comparison values, for updating the multicast bit pattern based on the plurality of comparison values to form an updated multicast bit pattern, and for performing at least one of retransmitting the buffered head-of-line cell, and buffering and transmitting a next cell, based on the updated multicast bit pattern.

17. The multicast switch of claim 16 wherein each bit of the multicast bit pattern is associated with a corresponding routing module.

* * * * *